US00H002273H

(19) United States
(12) Statutory Invention Registration
Nechitailo

(10) Reg. No.: US H2273 H
(43) Published: Dec. 4, 2012

(54) MESOPOROUS FILTER

(75) Inventor: Nicholas V. Nechitailo, Mechanicsville, VA (US)

(73) Assignee: The United States of America as represented by the Secretary of the Navy, Arlington, VA (US)

(21) Appl. No.: 12/804,605

(22) Filed: Jun. 30, 2010

Related U.S. Application Data

(62) Division of application No. 11/973,847, filed on Oct. 10, 2007, now Pat. No. 7,718,594
(60) Provisional application No. 60/854,461, filed on Oct. 11, 2006.

(51) Int. Cl.
*B01D 71/04* (2006.01)
*B05D 1/00* (2006.01)

(52) U.S. Cl. ..... 210/500.21; 210/500.25; 210/650; 210/651

(58) Field of Classification Search ..... 210/500.21, 210/500.25, 650, 651
See application file for complete search history.

(56) References Cited

U.S. PATENT DOCUMENTS 4,629,483 A 12/1986 Stanton ..... 55/487
4,971,696 A * 11/1990 Abe et al. ..... 210/500.25
5,110,470 A 5/1992 Yokosawa et al. ..... 210/500.1

(Continued)

OTHER PUBLICATIONS

Kresge, C.T. et al., "Ordered mesoporous molecular sieves synthesized. . . ", *Nature*(1992), 359, 710–712.

Beck, J.S. et al., "A New Family of Mesoporous Molecular Sieves. . . ", *J. Am. Chem Soc.*(1992), 114, 10834–10843.

Huo, Q. et al., "Generalized synthesis of periodic surfantant/inorganic composite materials", *Nature*(1994), 368, 317–321.

(Continued)

*Primary Examiner*—Daniel Pihulic
(74) *Attorney, Agent, or Firm*—Gerhard W. Thielman

(57) ABSTRACT

A particulate filter is provided for passing through select permeate particles in a fluid medium from inflow to outflow regions while restraining reticulate particles. The filter includes a coarse-grain ceramic porous substrate, an intermediate-grain porous ceramic layer, a fine-grain ceramic porous membrane, and a channel there-through. The substrate opens into the outflow region as an outflow cavity. The intermediate-grain porous ceramic layer is disposed on the substrate. The fine-grain ceramic porous membrane is disposed on the layer and opens into the inflow region containing the medium as an inflow cavity. The channel directionally expands and connects the inflow and outflow cavities together by a substantially funnel-shape passage. The inflow cavity permits the permeate particles and the medium but obstructs the reticulate particles. Additionally, a method is provided for producing a particulate filter that passes through select permeate particles in a fluid medium from inflow to outflow regions while restraining reticulate particles. The method includes providing an aluminum oxide substrate, disposing a sol-gel membrane onto the substrate to form a filtration unit, drying the filtration unit, and calcinating the filtration unit.

7 Claims, 18 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

U.S. PATENT DOCUMENTS

| | | | | | |
|---|---|---|---|---|---|
| 5,205,937 | A | * | 4/1993 | Bhave et al. | 210/651 |
| 5,773,103 | A | | 6/1998 | Ciora, Jr. et al. | 428/34.6 |
| 6,117,341 | A | | 9/2000 | Bray et al. | 210/309 |
| 6,572,685 | B2 | | 6/2003 | Dunshee | 96/59 |
| 6,703,675 | B1 | | 3/2004 | Rogers | 257/415 |
| 6,997,327 | B2 | | 2/2006 | Sprenger | 210/489 |
| 7,045,067 | B2 | | 5/2006 | Brown et al. | 210/793 |
| 7,378,018 | B2 | | 5/2008 | Cheng | 210/266 |

OTHER PUBLICATIONS

Zhao, X.S. et al., "Advances in Mesoporous Molecular Sieve MCM–41", *Ind. Eng. Chem. Res.*(1996), 35, 2075–2090.

Raman, N.K. et al., "Template–Based Approaches to the Preparation of . . . Silicas", *Chem. Mater.*(1996), 8, 1682–1701.

Lu, Y. et al., "Continuous formation of supported cubic and hexagonal mesoporous films. . . ", *Nature*(1997), 389, 364–368.

Bhave, R.R., *Inorganic Membranes*, Van Nostrand Reinhold ©1991, 16–23, 117–119, 124–141, 153, 276–299.

Baker, R.W. et al., *Membrane Separation Systems*(1991), 19–33.

Bhave, R.R., Fleming, H.L., "Removal of Oily Contaminants in Wastewater with Microporous Alumina Membranes", *AIChE Symposium Series*, 84, 261, (1988) pp. 19–27.

* cited by examiner

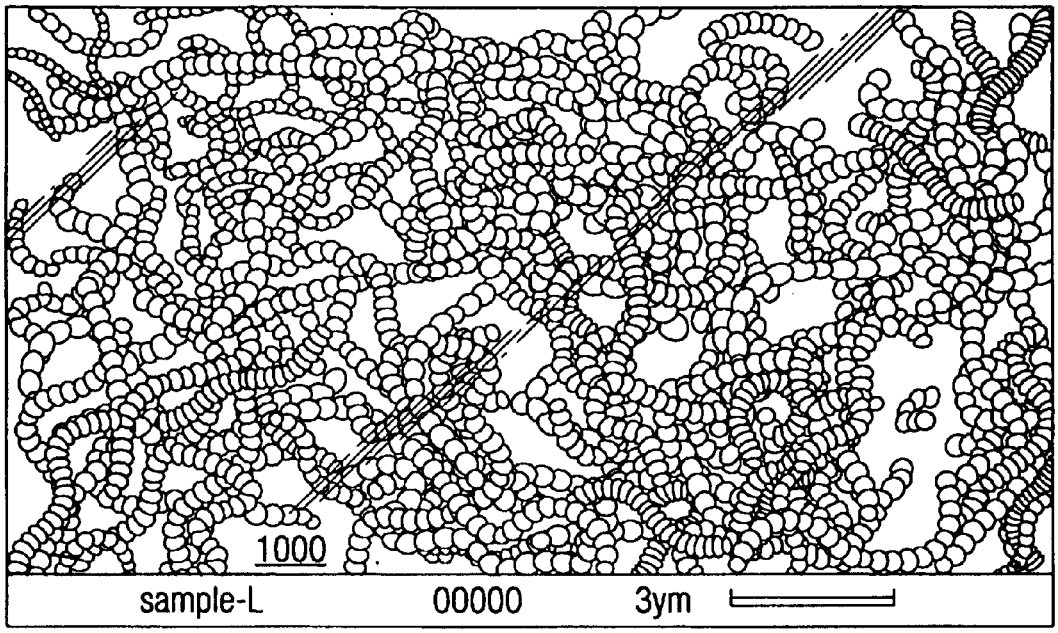

Fig. 10

1100

Table I. Tubular Filters: Chemical Composition

| Filter Number | Filter Length | Substrate and Nominal Pore Diameter | Membrane | CTAB*, wt% | Comments |
|---|---|---|---|---|---|
| 1 | 5 in | $ZrO_2$(~200Å) | $ZrO_2$ | 10 | |
| 2 | 5 in | $ZrO_2$ (~200Å) | $ZrO_2$ | 10 | |
| 5 | 5 in | $\gamma$-$Al_2O_3$ (~50Å) | $ZrO_2$ | 10 | |
| 6 | 5 in | $\gamma$-$Al_2O_3$ (~50Å) | $SiO_2$ | 2.5 | |
| 7 | 5 in | $\gamma$-$Al_2O_3$ (~50Å) | $SiO_2$ | 4.2 | |
| 8 | 5 in | $\gamma$-$Al_2O_3$ (~50Å) | None | N/A | reference uncoated filter |
| 8a | 10 in | $\gamma$-$Al_2O_3$(~50Å) | None | N/A | reference uncoated filter |
| 9 | 5 in | $ZrO_2$ (~200Å) | None | N/A | reference uncoated filter |
| 10 | 5 in | $ZrO_2$(~200Å) | $ZrO_2$ | 2.5 | |
| 11 | 5 in | $\gamma$-$Al_2O_3$ (~50Å) | $SiO_2$ | 2.5 | |
| 12 | 5 in | $\gamma$-$Al_2O_3$ (~50Å) | $SiO_2$ | 4.2 | |

* CTAB is cetyltrimethylammonium bromide, a template material

Fig. 11

1600

Table II. Tubular Filters:
Dry Bubble-point Pressure and Corresponding Pore Size

| Filter number | Coating | Substrate | Dry Bubble-point Pressure [Psi] | Estimated Pore Size[Å] |
|---|---|---|---|---|
| 9 | None | $ZrO_2$ (~200Å) | 1.5 | 200 |
| 1 | $ZrO_2$ | $ZrO_2$ (~200) | 0.4 | 190 |
| 2 | $ZrO_2$ | $ZrO_2$ (~200Å) | 2.5 | 110 |
| 5 | $ZrO_2$ | $\gamma$-$Al_2O_3$ (~50Å) | 4.5 | 65 |
| 8 | $ZrO_2$ | $\gamma$-$Al_2O_3$ (~50Å) | 5.5 | 50 |
| 8a | None | $\gamma$-$Al_2O_3$ (~50Å) | 5.5 | 50 |
| 10 | $ZrO_2$ | $ZrO_2$ (~200Å) | 8.9 | 34-38 (37)* |
| 6 | $SiO_2$ | $\gamma$-$Al_2O_3$ (~50Å) | 25.0 | 7-12 |
| 12 | $SirO_2$ | $\gamma$-$Al_2O_3$ (~50Å) | 45.0 | 2.0-7.0 |
| 11 | $SiO_2$ | $\gamma$-$Al_2O_3$ (~50Å) | 48.9 | 1.6-6.0 |
| 7 | $SiO_2$ | $\gamma$-$Al_2O_3$ (~50Å) | >50.0 | 0.5-5.0 |

Fig. 16

1700

Table III. Tubular Filters:
Permeate Flow Rate of Deionized Water Ranked by Poor Diameter

| Filter number | Pressure, psi | | Duration of run, Minutes | Volume of Permeate, mL | Permeate Flow Rate, mL/hour | |
|---|---|---|---|---|---|---|
| | At Input to Filter, $P_1$ | At Retentate Output, $P_2$ | | | Measured | Scaled* |
| 9 | 35 | 32 | 1 | 28 | 1680 | 1680 |
| 1 | 35 | 32 | 2 | 20 | 600 | 600 |
| 2 | 35 | 33 | 2 | 24 | 720 | 709 |
| 5 | 35 | 34 | 30 | 10.5 | 21 | 20 |
| 8 | 30 | 26 | 20 | 3.8 | 11.4 | 13.6 |
| 8a | 35 | 33 | 20 | 7.5 | 22.5 | 11.1 |
| 8b | 36 | 34 | 20 | 8.25 | 24.8 | 11.8 |
| 10 | 35 | 33 | 30 | 7.5 | 15 | 14.8 |
| 6 | 39 | 36 | 30 | 3.0 | 6.0 | 5.3 |
| 12 | 35 | 33 | 60 | 9.5 | 9.5 | 9.4 |
| 11 | 35 | 33 | 60 | 2.1 | 2.1 | 2.1 |
| 7 | 35 | 30 | 60 | 2.3 | 2.3 | 2.4 |

Fig. 17

2400

Table IV Filtration Efficiency, of selected membrane filters

| Filter number | Strontium salt | Strontium and DTPA, basic pH | Strontium and 8000MW PAA |
|---|---|---|---|
| F6s | 98.4 | | |
| F14t | 15 | 99.70% | 99.95% |
| F17t | 19 | 99.95% | 99.69% |
| F18z | 56 | 99.30% | 99.90% |
| F26z | 55 | 99.00% | 99.00% |

Fig. 24

2500

Table V. Filtration of Strontium using Zirconia Membrane Filters.

| Filter No. | Percent Reduction in Sr via ICP-MS Analysis | | | | | Percent Reduction in Sr via UV-Vis Analysis | Notes |
|---|---|---|---|---|---|---|---|
| | $Sr(NO_3)_2$ 212 MW | $Sr(NO_3)_2$ Plus DTPA 393 MW | $Sr(NO_3)_2$ Plus Sulfonazo 725 MW | $Sr(NO_3)_2$ Plus PAA 1200 MW | $Sr(NO_3)^2$ Plus PAA 8000 MW | | |
| 31 | 73 | $97_{33mL/h}$ | 78 | | | | |
| 30 | 63 | 99.3 | 70 – 81 | | | | pH ≈ 8-10 (DTPA) |
| 28 | 49 | 99.55 | 65 – 70 | | | | pH ≈ 8-10 (DTPA) |
| 26 | 32 | 99.65 | 90.9 | | 99.63 | | pH ≈ 8-10 (DTPA) |
| 24 | 39 | 97 | 60 | | | | pH ≈ 8-10 (DTPA) |
| 21 | 71 | 85 | 64 | | | | pH ≈ 2 (DTPA) |
| | | 99.39 | | | | | pH ≈ 8-10 (DTPA) |
| 19 | 29 | 65 | 15 – 16 | | | | Reference substrate pH ≈ 8-10 (DTPA) |
| 18c | 82* | 45 | 98.1 | | | 50 | pH ≈ 2 (DTPA) |
| | | > 99.94+ | | | | 86 | pH ≈ 8-10 (DTPA) |
| 18 | 56* | 36 | 66 | | | | pH ≈ 2 (DTPA) |
| | | 99.3 | | | | 100 | pH ≈ 8-10 (DTPA) |
| 2c | 82 | 16 | 95 | 86 | 99.82 | | pH ≈ 2 (DTPA) |
| | | 96 | | | | | pH ≈ 8-10 (DTPA) |

* Average percent reduction

\+ Concentration of strontium in permeate is below detectable limits of ICP-MS.

PAA is polyacrylic acid

DTPA is diethylamine triamine pentaacetic acid

Fig. 25

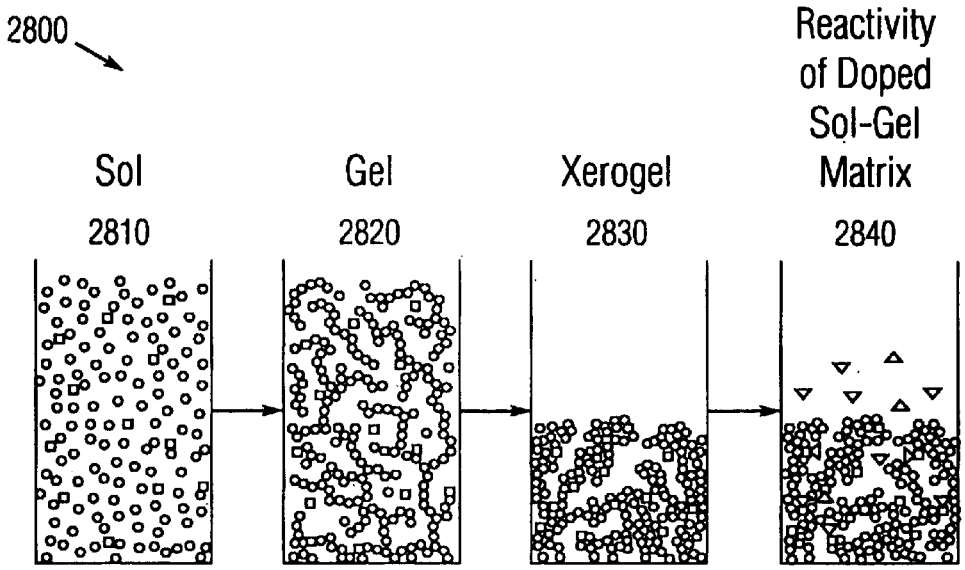

Fig. 28

Table VI. Examples of Dyes and Modifiers

| Modifier | Compound |
|---|---|
| Dye | Bromocresol purple<br>Oxazine 170<br>1, 1'-Dioctyldecyl-3,3,3'3'-tetramethylindodicarbocyanine perchlorate |
| Silane | 3,3,3-Trifluoropropyltrimethoxysilane<br>Tridecafluoro-1,1,2,2-tetrahydrooctyl-1-triethoxysilane<br>3-Aminopropyltrimethoxysilane<br>3-mercaptopropyltrimethoxysilane |
| Nitrate Salts | Iron (III) nitrate<br>Copper (II) nitrate |
| Polyoxometallate | $H_5PV_2MO_{10}O_{40}\bullet 13H_2O$<br>$NA_5PV_2MO_{10}O_{40}\bullet 13H_2O$<br>$H_5SiVW_{11}O_{40}\bullet 13H_2O$<br>$K_5SiVW_{11}O_{40}\bullet 13H_2O$<br>$H_3PV_{12}O_{40}\bullet 13H_2O$<br>$K_5CrSiW_{11}O_{39}\bullet 14H_2O$ |
| Polymer | Nafion®<br>Polydimethylsiloxane |

2900

Fig. 29

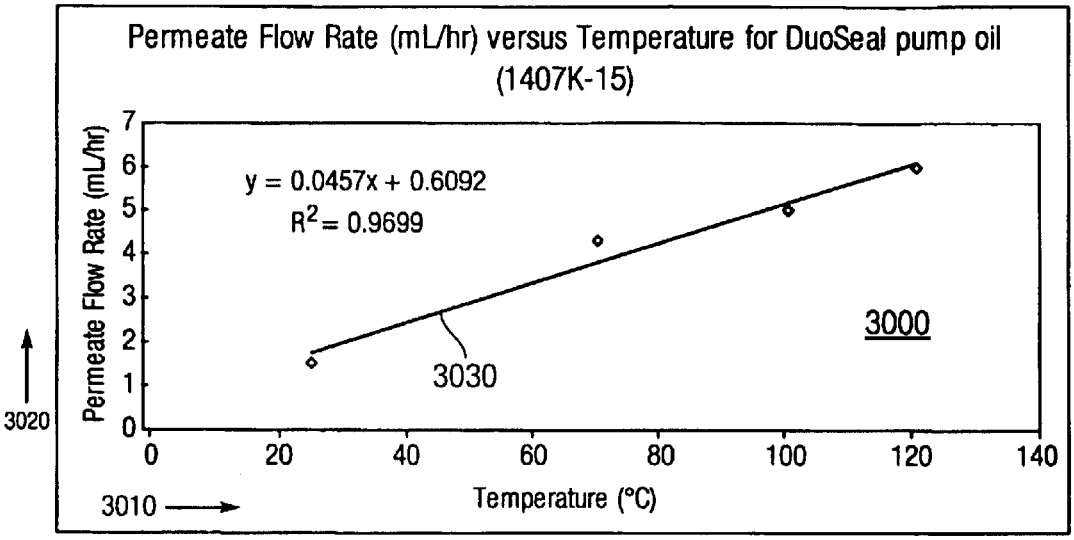

Fig. 30

3100

Summary of tests:

| | | | |
|---|---|---|---|
| • P01: | Filter: F49, | Temp.: 25°C, | Flow rate: 0.0 mL/hr, |
| • P02: | Filter: F49, | Temp.: 70°C, | Flow rate: 4.3 mL/hr, |
| • P03: mL/hr, | Filter: F49, | Temp.: 100°C, | Flow rate: 5.0 |
| • P04: mL/hr, | Filter: F49, | Temp.: 120°C, | Flow rate: 6.0 |
| • P05: | Filter: F49, | Temp.: 25°C, | Flow rate: 3.16 mL/hr, |
| • P06: | Filter: F49, | Temp.: 25°C, | Flow rate: 1.43 mL/hr, |
| • P08: | Filter: F49, | T: 25°C, P: 35 psi | Flow rate: 963.2 mL/hr, |
| • P09: | Filter: F49, | T: 25°C, P: 35 psi | Flow rate: 1044 mL/hr, |
| • P010: | Filter: F49, | T: 25°C, P: 70 psi | Flow rate: 2061 mL/hr, |
| • P011: | Filter: F49, | T: 25°C, P: 70 psi | Flow rate: 2050 mL/hr, |
| • P012: | Filter: F49, | T: 25°C, P: 50 psi | Flow rate: 1532 mL/hr, |
| • P013: | Filter: F49, | T: 25°C, P: 50 psi | Flow rate: 1445 mL/hr, |

Fig. 31

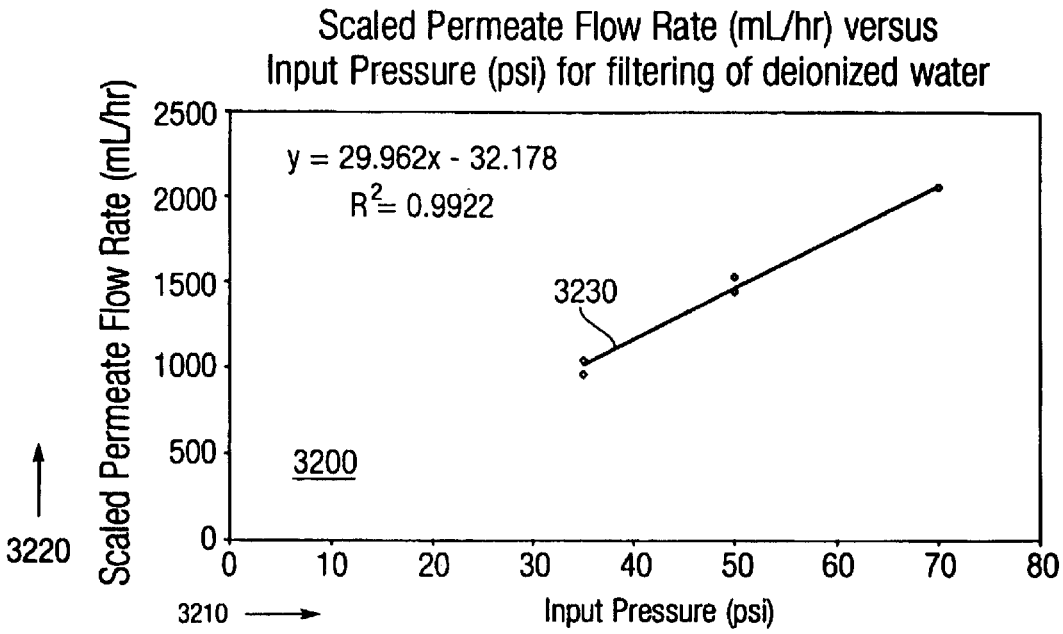

Fig. 32

3300

Summary of tests using contaminated motor oil SAE 30 HD

| | | |
|---|---|---|
| • M01: | Temp.: 25°C, | Flow rate: 2040 mL/hr, |
| • M02: | Temp.: 60°C, | Flow rate: 1230 mL/hr, |
| • M03: | Temp.: 60°C, | Flow rate: 37.5 mL/hr. |
| • M04: | Temp.: 25°C, | Flow rate: 1930 mL/hr, |
| • M05: | Temp.: 25°C, | Flow rate: 2340 mL/hr, |
| • M06: | Temp.: 25°C, | Flow rate: 1890 mL/hr, |
| • M07: | Temp.: 25°C, | Flow rate: 1830 mL/hr, |
| • M08: | Temp.: 25°C, | Flow rate: 1770 mL/hr, |
| • M09: | Temp.: 25°C, | Flow rate:. 1800 mL/hr. |
| • M010: | Temp.: 60°C, | Flow rate: mL/hr, |
| • M011: | Temp.: 60°C, | Flow rate: mL/hr, |
| • M012: | Temp.: 60°C, | Flow rate: mL/hr, |
| • M013: | Temp.: 60°C, | Flow rate: mL/hr, |
| • M014: | Temp.: 60°C, | Flow rate: mL/hr, |
| • M015: | Temp.: 60°C, | Flow rate: mL/hr. |

Fig. 33

MESOPOROUS FILTER

STATEMENT OF GOVERNMENT INTEREST

This application is a division of U.S. patent application Ser. No. 11/973,847 filed Oct. 10, 2007, issued as U.S. Pat. No. 7,718,594 and identified as Navy Case 97750, which claims the benefit of United States Provisional Patent Application Ser. No. 60/854,461, filed Oct. 11, 2006, and the entirety of both applications are hereby incorporated by reference in this application.

BACKGROUND

The invention relates generally to particulate filtration. In particular, the invention relates specifically to mesoporous filtration using ceramic metal oxides based on particular grain sizes.

Contaminants in drinking water present high risks to human health; pathogenic microorganisms, disinfectant by-products, arsenic and heavy metals can cause cancer and other toxic effects. Organic and inorganic agents such as pesticides, ammonium perchlorate ($Al(ClO_4)_3$), arsenic (As), nitrite ($NO_2^-$), sulfate ($SO_4^{2-}$), radon (Rn), particulates and pathogens including cyst-like organisms and emerging pathogens like caliciviruses, microsploridia, hepatitis A virus and Legionella must be removed from drinking water.

Filtration and separation can be accomplished with porous membranes. A microfiltration membrane process presents a cost-effective medium for rapid removal of chemical and biological agents from water. However, microfiltration does not provide efficient removal of nanometer-sized bacteria, viruses and metal ions. Ultrafiltration (UF) membranes with nominal pore diameters (measured in angstroms) of 20Å to 200Å are used in a variety of solid-liquid separation processes, representing a fairly large market in the sectors of waste remediation, drink clarification, oil processing and fractionation of biomolecules.

Polymer membranes supplies much of the market for ultrafiltration membranes. These are limited in their application by chemical and thermal stability, mechanical strength and pore size distribution. See R. W. Baker et al., Membrane Separation Systems, Noyes Data Corporation, Parkridge, N.J. (1991), and R. R. Bhave, *Inorganic Membranes*, Van Nostrand, Reinhold, N.Y. (1991). In contrast, commercial ceramic membranes, such as Membralox® and Carbosep®, have significantly better thermal, chemical and mechanical stability than organic membranes. However, these ceramic membranes are limited by tortuous, irregularly sized pores that lead to fouling, poor separations and inefficient permeance. See Canadian Patent 1,168,590 to Arod et al. have used ceramic ultrafiltation membranes (pore size 20 nm to 40 nm) to remove contaminants from used motor oil.

Contaminant removal has been demonstrated at far lower energy consumption than distillation and with a far smaller waste stream than with the conventional acid treatment followed by centrifugation. See A. Deschamps et al., "Application of Inorganic Membranes in Refining Processes of Petroleum Residues", *Proc. 1st Intn'l. Conf. Inorganic Membranes,* 237 (July 1990), regarding ceramic ultrafiltation membranes (pore diameter above 15 nm) to separate catalyst particles from a hydrocarbon stream at 250° C.

Ceramic ultrafiltation membranes have also been shown to be effective in separation of oil from aqueous streams, as reported in Bhave, *Inorganic Membranes*. About 99.5% of lubricating oil in a 0.1% oil/balance water stream was rejected by ceramic membranes. A water flux of 7.5 L/h- $m^2$ across the membrane (4 nm to 50 nm pore size) was obtained with a trans-membrane pressure of 3 bar, as reported by R. R. Bhave et al., "Removal of Oily Contaminants in Wastewater with Microporous Alumina Membranes," *AIChE Symp. Ser.*, 84, 261, p. 19 (1988).

SUMMARY

Conventional filtration devices yield disadvantages addressed by various exemplary embodiments of the present invention. In particular, conventional devices compromise between particulate size and pressure drop across the filter.

Various exemplary embodiments provide a particulate filter for passing through select permeate particles in a fluid medium from inflow to outflow regions while restraining reticulate particles. The filter includes a coarse- grain ceramic porous substrate, an intermediate-grain porous ceramic layer, a fine-grain ceramic porous membrane, and a channel there-through. The substrate opens into the outflow region as an outflow cavity. The intermediate-grain porous ceramic layer is disposed on the substrate. The fine-grain ceramic porous membrane is disposed on the layer and opens into the inflow region containing the medium as an inflow cavity.

The channel directionally expands and connects the inflow and outflow cavities together by a substantially funnel-shape passage. The inflow cavity permits the permeate particles and the medium but obstructs the reticulate particles. These various exemplary embodiments provide for high flow rates and high percentage removal of solid particles and agents from liquid. The gaps in the above structure are interconnected forming low-tortuosity channels across ceramic membrane and supporting porous substrate.

Additionally, various exemplary embodiments provide a method for producing a particulate filter that passes through select permeate particles in a fluid medium from inflow to outflow regions while restraining reticulate particles. The method includes providing an aluminum oxide substrate, disposing a sol-gel membrane onto the substrate to form a filtration unit, drying the filtration unit, and calcinating the filtration unit.

BRIEF DESCRIPTION OF THE DRAWINGS

These and various other features and aspects of various exemplary embodiments will be readily understood with reference to the following detailed description taken in conjunction with the accompanying drawings, in which like or similar numbers are used throughout, and in which:

FIG. 10 is a photographic enlargement of a zirconia layer deposited on glass substrate;

FIG. 11 is a table of tubular filters by chemical composition;

FIG. 16 is a table of tubular filter comparisons of bubble-point pressure;

FIG. 17 is a table of tubular filter comparisons of permeate flow rate;

FIG. 24 is a table of filtration efficiency comparison;

FIG. 25 is a table of filtration tests;

FIG. 28 is a process chart of sol-gel matrix production;

FIG. 29 is a table of a example dyes;

FIG. 30 is a curve-fit graph of permeate flow rate temperature sensitivity;

FIG. 31 is a summary table of tests;

FIG. 32 is a curve-fit graph of permeate flow rate pressure sensitivity; and FIG. 33 is a summary table of oil filtration tests.

DETAILED DESCRIPTION

Figure 1:
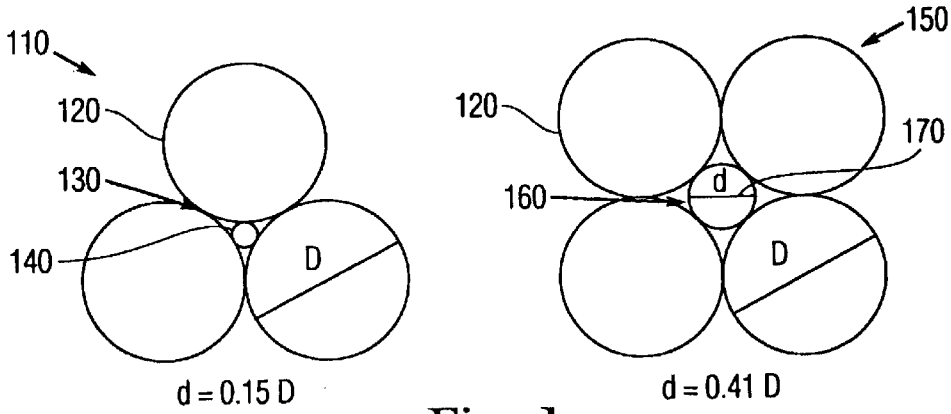
FIG. 1 is cross-section views of grains forming pore gaps.

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the present invention is defined only by the appended claims.

Inexpensive, high flow rate, sharp-cut-off membrane filters are necessary for uftrafiltration and liquid-solid separation of organic and inorganic compounds. Defense application includes separation and detection of chemical and biological agents. Commercial application includes food and beverage, petroleum processing, biotechnology and medical sectors; examples include: particles separation, oil purification, catalytic membrane reactors, supports for nanocomposites, and particulate removal from waste streams.

By depositing a porous membrane onto a larger-pore substrate, the permeate flow rate enables proportionally to be reduced to $d^4$, where d is pore diameter of the membrane. For example, a membrane with pore diameter two times smaller than that of substrate may cause sixteen times reduction in flow rate. Ultrafiltration membranes usually exhibit low permeation rates. Example ceramic candidates for filtration purposes include aluminum oxide ($Al_2O_3$ or alumina), zirconium oxide ($ZrO_2$ or zirconia), silicon oxide ($SiO_3$ or silica) and titanium oxide ($TiO_2$ or titania).

Various exemplary embodiments introduce mesoporous ceramic membrane filters with high flow rates and sharp cut-off by providing a layered ceramic porous structure with funnel geometry and reduced resistance to permeate flow. This structure provides for high flow rates and high percentage removal of solid particles and agents from liquid. The gaps in the above structure are interconnected forming low-tortuosity channels across ceramic membrane and supporting porous substrate.

Also, various exemplary embodiments describe methods of fabrication of graded layered granular ceramic membranes with funnel-shaped channels. These exemplary filters can be described as high-surface-area, layered ceramic membrane structures with funnel-type channels exhibiting low tortuocity and providing for faster fluid flow, at low pressure. The funnel geometry of the channels with smaller diameter at the funnel inner end and larger diameter at the funnel outer end reduces resistance to the fluid flow, and therefore, increase flow rates.

A series of experiments revealed that multilayered ceramic filters provided up to 99.96% reduction of cesium and strontium ions from water at flow rates significantly higher than those in commercially available ceramic membrane filters. Several membrane filters had flow rates close to or above those of uncoated large-pores substrates. This disclosure proposes the concept of funnel-type reduced-turbulence channels, and describes the design of mesoporous filters, development and optimization of sol-gel deposition process, and microstructural characterization and testing of the filters.

This new class introduces high flow-rate, layered, mesoporous ceramic membrane filters with tailorable pore size distribution, high selectivity, high thermo-mechanical strength and chemical stability for particle separation and ultrafiltration. This effort was directed toward the conceptual design of a new class of high flow rate mesoporous ceramic membranes with high density of pores (from 5Å to 50Å in diameter). Reduction of hydraulic resistance by using funnel-type channels across the filter thickness should significantly improve flow rates. Influence of the structural changes, such as thickness of layers and pore orientation on the flow stability and turbulence of fluid, was analyzed.

Several models have been developed to describe fluid flow through porous media and variable passages. These include models of seepage and percolation that found application in the problems of sedimentation and groundwater movement. Models of laminar and turbulent flow through narrow channels can be applied to the flow across the mesoporous membranes. F. M. White, *Viscous Fluid Flow*, McGraw-Hill (1974) described main stages of a steady fluid flow through a constant-cross-section tubular channel. Wall friction causes a viscous layer to begin at the inlet and grow downstream, possibly becoming turbulent further inside the channel. The viscous layers coalesce so that the channel is then completely filled with boundary layer.

Further, downstream of the coalescence, the flow profile ceases to change with axial position and became a fully developed flow. In the fully developed flows the initial growing shear layer and acceleration effects can be neglected. Fully developed regions are usually occurred at some finite downstream distance. Several solutions have been obtained for linear problems when streamlines are straight parallel lines. This type of problem can be solved by considering only one component of velocity vector, $u \equiv v_x$ that coincides with the axis, x, of the channel. This type of dynamic problem is described by eqn. (1):

$$\rho \frac{\partial u}{\partial t} = -\frac{\partial P}{\partial x} + \mu\left(\frac{\partial^2 u}{\partial y^2} + \frac{\partial^2 u}{\partial^2 z}\right) \tag{1}$$

where ρ is mass density, P is pressure, μ is viscosity of the fluid, x, y and z are orthogonal coordinates, and t is time. Coordinate x is along the channel axis, $0<x<h$, where h is the channel length. Kinematic viscosity of fluids is $\nu=\mu/\rho$. For water at 15° C., μ=1.1403cP=0.0114 g/(cm s) and $\nu=1.138\times10^{-6}$ m²/sec. Also, for water at 99° C., μ=0.2838cP or about four times lower than that at 15° C. For SAE30 oil at 15° C., $\nu=5\times10^{-4}$ m²/sec, while at 99° C., $\nu=1\times10^{-4}$ m²/sec.

For steady-state problems, the transient term ∂u/∂t in eqn. (1) can be neglected. In this case, steady-state fluid flow driven by the pressure gradient, dP/dx can be described as:

$$\frac{1}{\mu}\frac{dP}{dx} = \Delta u.$$

White has analyzed steady fully developed duct flows in the case when ducts have arbitrary but constant cross-section shape. In the case of circular channels Laplacian can be expressed in the polar system of coordinates:

$$\Delta = \frac{l}{r}\frac{d}{dr}\left(r\frac{d}{dr}\right)$$

where r is the radial coordinate.

The corresponding solution for velocity of the Hagan-Poiseuille flow is known as eqn. (2);

$$u = \frac{1}{4\mu}\frac{dP}{dx}(r_o^2 - r^2) \tag{2}$$

where $r_o$=d/2 is the channel radius. The distribution of the velocity is a paraboloid of revolution with maximal velocity along the axis of symmetry and equals to zero on the wall of the channel. The corresponding flow rate, Q, (unit volume per unit time) depends on the channel size and cross-section, as per White:

$$Q = \int_A u dA = k\frac{d^4}{\mu}\frac{dP}{dx} \tag{3}$$

where A is cross-sectional area of the channel, k is the cross-sectional shape constant and d is the maximal width or diameter of the channel. Permeate fluid flux is flow rate per area of the cross-section, defines as Q/A. Mesoporous membranes can be composed of nano-sized grains packed in a certain order. Gaps between the grains in the direction normal to the membrane surface will serve as channels through the membrane. For circular channels, shown in FIG. 1, $k=\pi/128\approx0.0245$ and for triangle-shaped channels, with maximal width, d, the constant $k=\sqrt{3}/320\approx0.0054$.

FIG. 1 shows planar views of circular cross-sectional grains. A first view 100 features a triplet of grains 120 having diameter D with an interface gap 130 yielding a small circular pore 140 of diameter d=0.15 D. A second view 150 features a quartet of grains 120 with an interface gap 160 yielding a larger circular pore 170 of diameter d=0.41 D.

Equivalent pore diameter is a function of grain size. For a filter wall of thickness, h, that has interconnected pores of diameter, d, forming short straight channels of length, h, the permeate fluid flux, J, (unit volume per unit area per unit time) can be evaluated by:

$$J = \frac{N\pi}{128}\frac{d^4}{\mu}\frac{P_F - P_P}{h} \tag{4}$$

where N is the surface density of pores, $P_F$ is feed pressure and $P_P$ is permeate pressure. According to eqns. (3) and (4), permeate flow rate and permeate flux are very sensitive to the channel diameter, $d^4$, and are linearly proportional to the pressure gradient: $Q=\lambda d^4$ where λ is the parameter characterizing filter capability of permeation fluid at high flow rates. This parameter can be expressed as a function of membrane thickness, tortuocity, density of pores, pressure and fluid viscosity:

$$\lambda - \frac{kNA}{\beta h}\frac{P_F - P_P}{h} \tag{5}$$

where β>1 is the coefficient of tortuocity as the ratio of the channel length to the thickness, h, and surface area, A.

Figure 2:
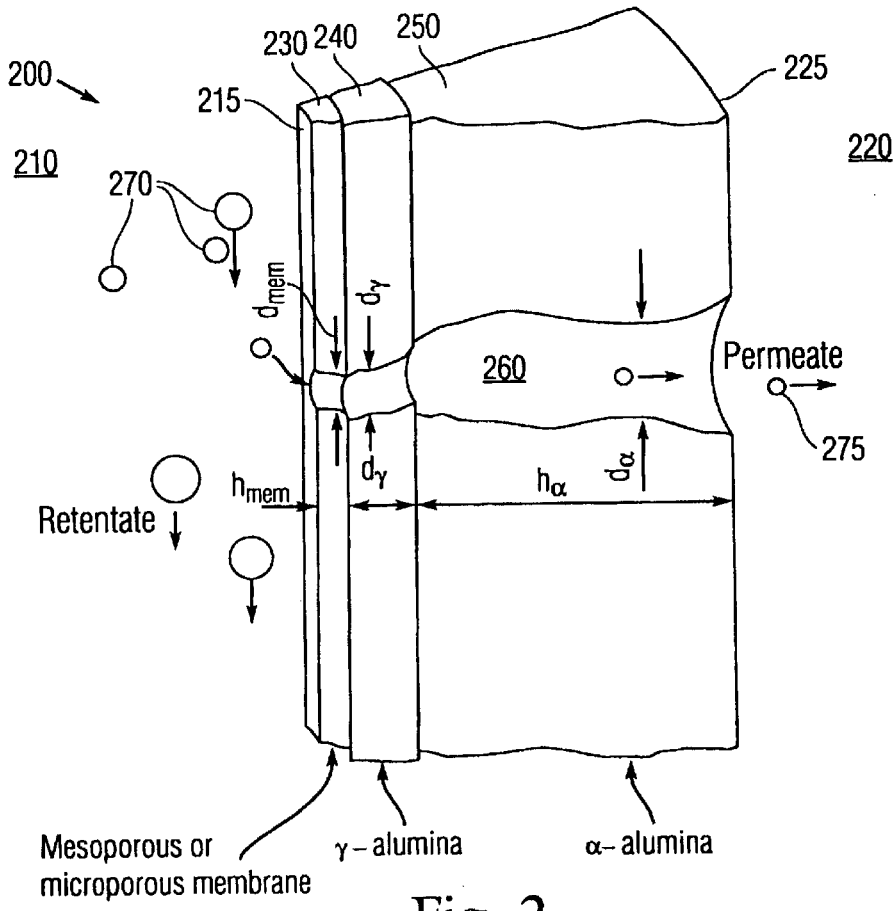
FIG. 2 is an isometric view of an annular filter portion.

FIG. 2 illustrates proposed concept of a high-flow rate membrane tubular filter, for example an isometric view 200 of a section of an axisymmetric filter membrane. An inner region 210 containing a solution represents a cavity defined by a channel wall surface 215 separating the solution from an outer region 220 defined by an external wall 225. The filter medium between the walls 215, 225 includes, in radially expanding order, a mesoporous or microporous membrane 230, a γ-alumina portion 240 and an α-alumina substrate 250. Alumina ($Al_2O_3$) has crystalline phases including hexagonal alpha and cubic gamma forms.

An expanding filtration channel 260, such as formed by pores between grains, connects the regions 210, 220. The solution contains solid particles 270 (e.g., chemical and biological agents) forced into the tubular cavity 210. Smaller particles pass through channels (or pores) of the membrane as permeate, while larger particles remain in the initial region as retentate. In this embodiment, the membrane is deposited on larger-pore size γ-alumina, supported by a very large-pore α-alumina substrate.

Figure 3:
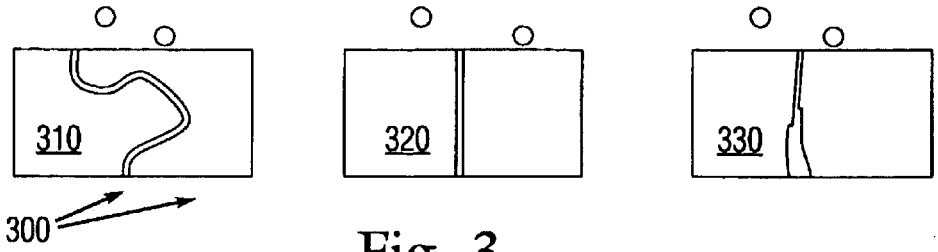
FIG. 3 is a cross-section view of comparative channel paths.

FIG. 3 illustrates different types of channels 260 in three cross-sectional views 300. A first view 310 shows a convoluted path. A second view 320 shows a straight path. A third path 330 shows a funnel path. Straight channels, oriented in the direction normal to the membrane surface, form the shortest paths from inner to outer surfaces. Funnel channels with diameter gradually increasing from inner to outer surfaces provide for minimum resistance to permeate flow and thus maximum flow rates, particularly in comparison to tortuous non-expanding channels.

High-flow-rate filters should have a large number of pores per surface area and relatively small membrane thickness. Also, pores should be interconnected in the fashion providing low tortuocity to form a short path from inner surface of the filter to its outer surface. The roughness of the channel surface depends upon the size of the grains, while channel tortuocity depends upon the orientation of the grains.

For funnel-shaped channels constructed from several layers, major resistance to the flow originates from the upper layer due to its smallest pores. Consequently, the thickness of this fine-pore layer should preferably be minimized to increase permeate flow rate. However, the thickness should be sufficient to withstand trans-membrane pressure. This requires solution of optimization problem involving mirofluidics and membrane strength.

For substrate and/or sublayer having coefficients of thermal expansion higher than that in newly deposited membrane, thermal stresses along the membrane- sublayer are compressive. This can result in the compression and reduction of the channel diameters. This effect should preferably be accounted for in selection of materials and thermal processing regimes. Photographic enlargements further described in the drawings illustrate several types of ceramic membranes developed in this work.

Figure 4:
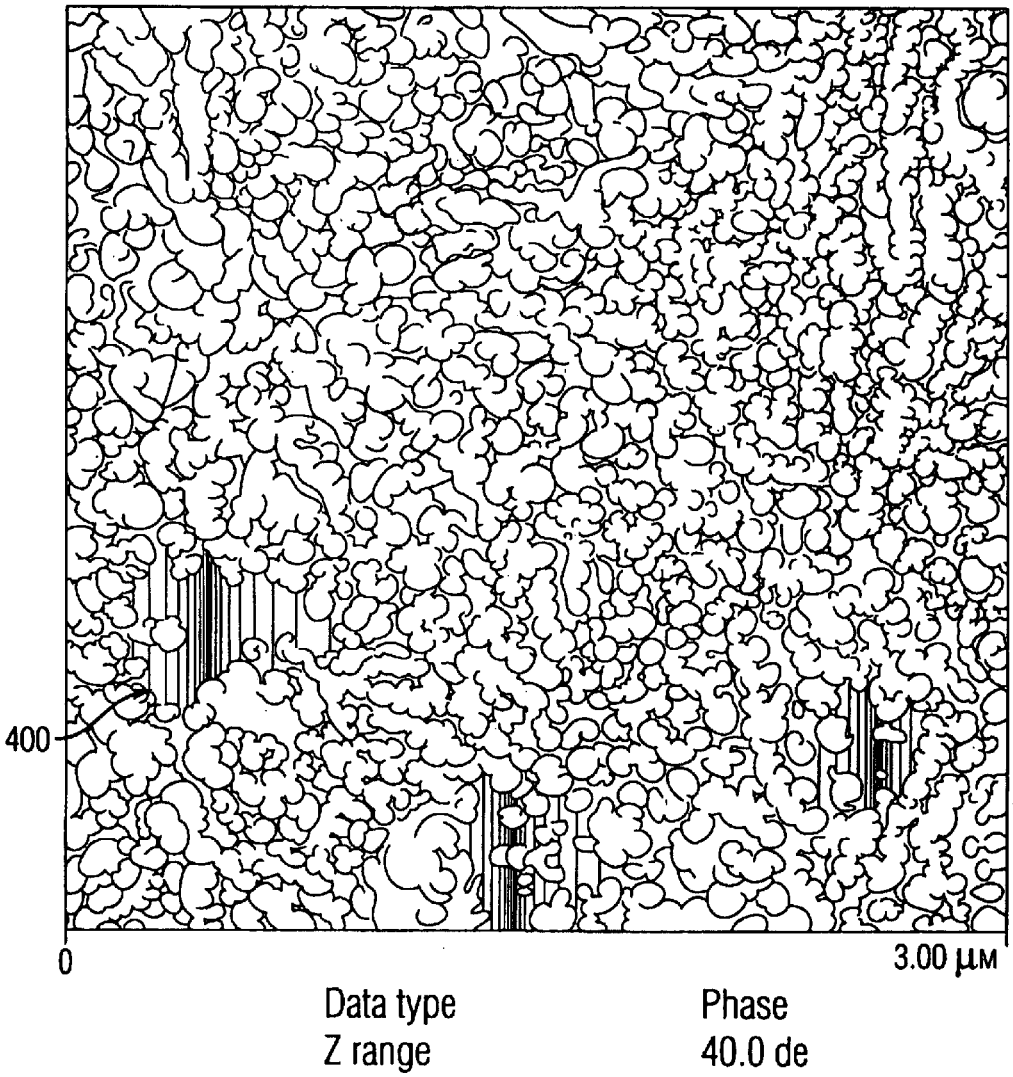
FIG. 4 is a planar photographic enlargement of a zirconia membrane.

FIG. 4 shows an enlarged photographic image 400 of a fine-grain zirconia ($ZrO_2$) membrane deposited on large-grain alumina disk. A phase image from an atomic force microscope shows narrow size distribution of the grains in zirconia membrane, nearly 60 μm in diameter. Zirconia film was deposited on alumina substrate using 2% cetyltrimethylammonium bromide (CTAB or $CH_3(CH_2)_{15}N(CH_3)_3Br$) solution and 3 in/mm speed.

Figure 5:
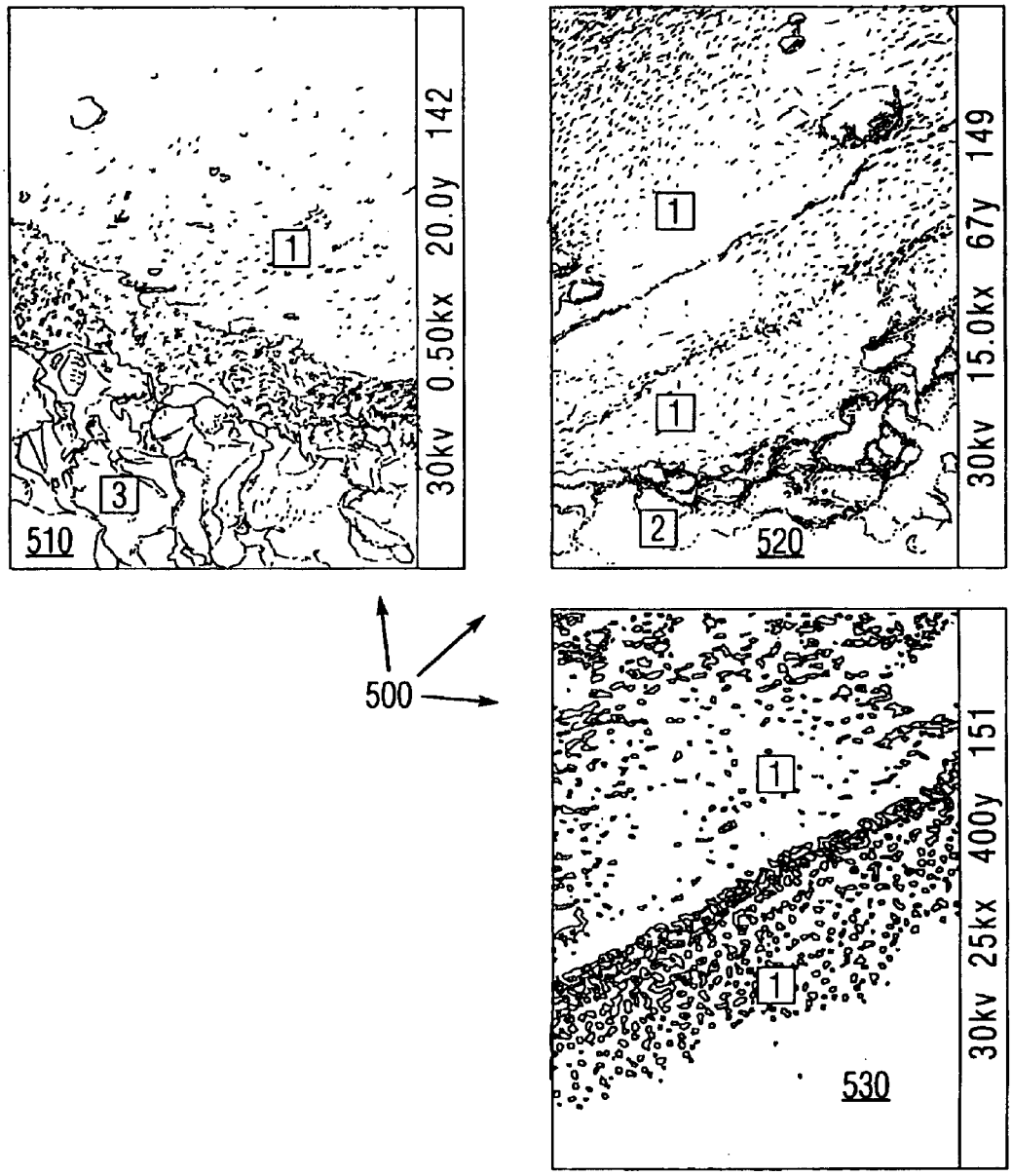
FIG. 5 is a series of photographic enlargements of a silica membrane on alumina substrates.

FIG. 5 shows scanning electron microscope photographs 500 of the cross- section of a tubular filer at different levels of magnification: first 510 at 500× (i.e., times magnification) enlargement, second 520 at 15,000×, third 530 at 25,000×. In this example, a silica membrane was deposited on γ-alumina layer in turn deposited on α-alumina substrate. Scanning electron microscope photographs of the cross-section of filter #6 (described subsequently) at different levels of magnification with square labels: 1 is silica membrane, 2 is γ-alumina layer, and 3 is α-alumina substrate.

Figure 6:
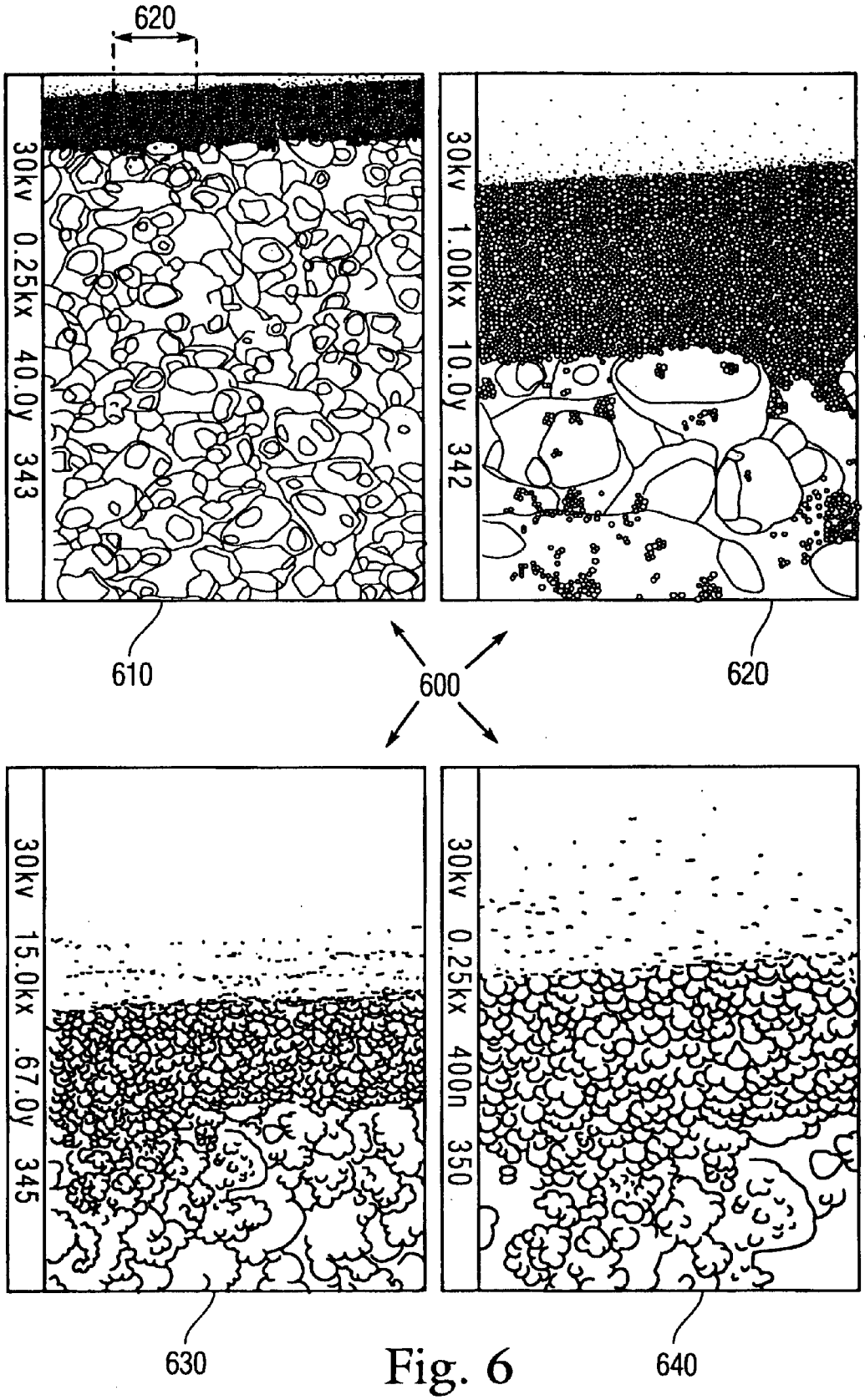
FIG. 6 is a series of photographic enlargements of a filter produced without surfactant.

FIG. 6 illustrates enlarged views 600 of a cross section of the filter produced with no surfactant, with top layer composed of titania and γ-alumina as middle layer. Enlargements for the images include first image 610 at 250×, second image 620 at 1000×, third image 630 at 15,000×and fourth image 640 at 25,000×. Scanning electron microscope photographs of the cross-section of filer #73 (produced without surfactant; excellent flow rate and superior separation efficiency) at different levels of magnification. Top layer is a titania membrane, approximately 1 μm thick, middle layer is γ-alumina, and tubular substrate was made of α-alumina.

Figure 7:
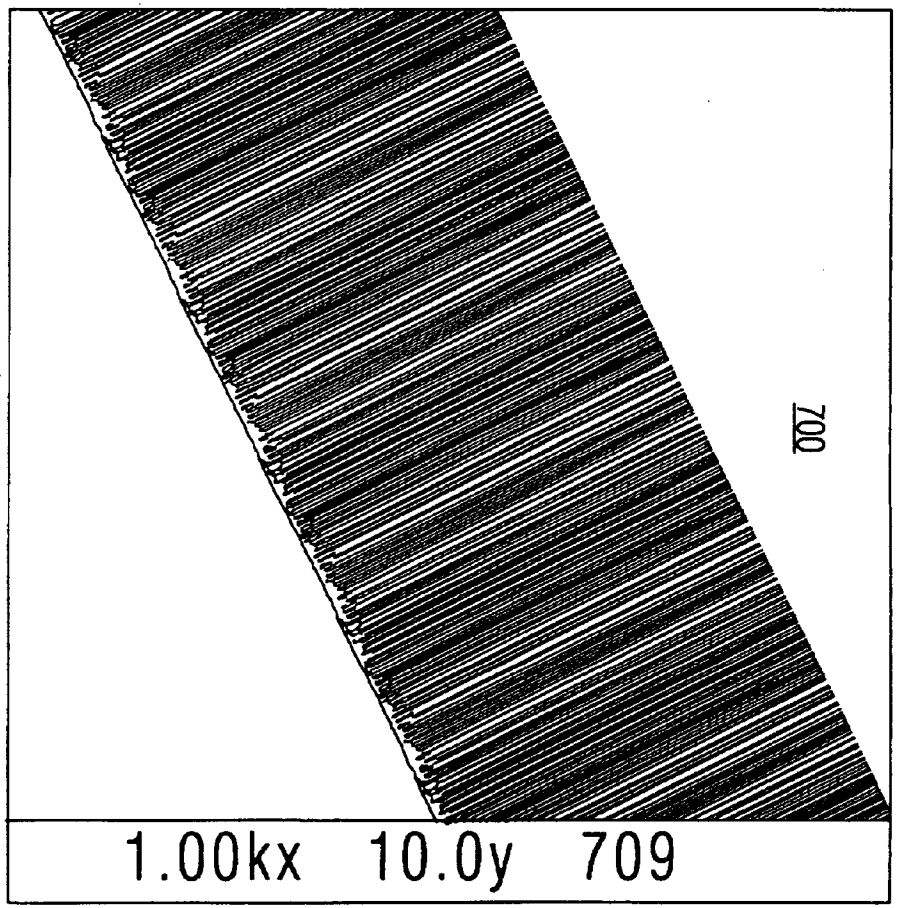
FIG. 7 is a photographic enlargement of an alumina substrate.
Figure 8:
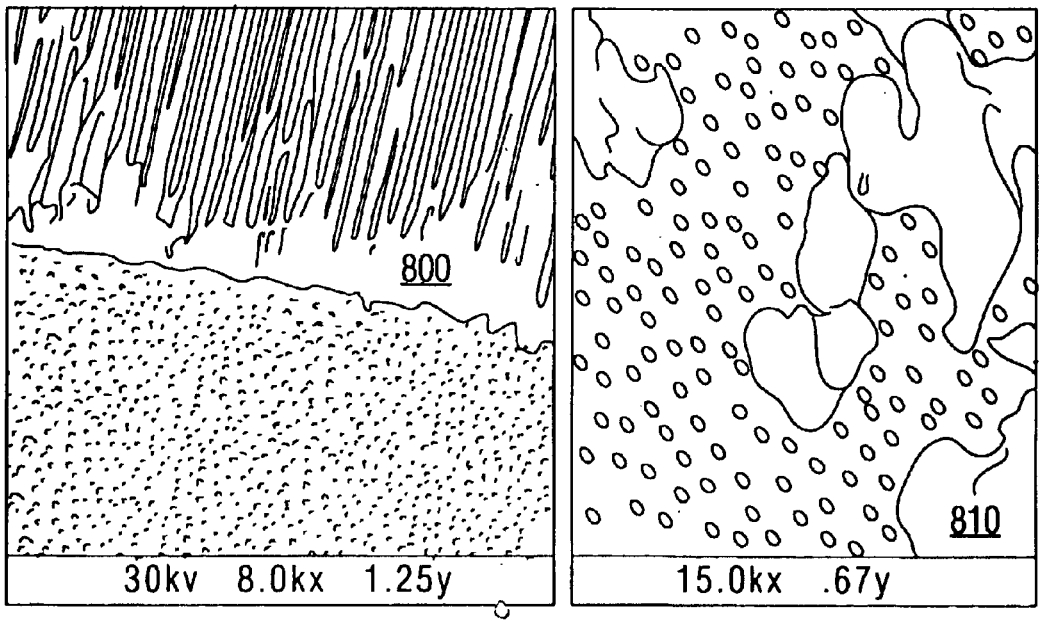
FIG. 8 is a pair of photographic enlargements of an alumina substrate.

FIG. 7 shows in another photograph 700 of improved alumina substrates with high flow rate channels and high density of pores for depositing fine-grain ceramic membranes. In particular, magnification for the photograph 700 is 1000×. Similarly, FIG. 8 enlarges this further in first and second photographs 800, 810 by 8000× and 15,000×, respectively. Scanning electron microscope photographs of the cross-section of alumina substrate disks exhibiting very high flow rates. The image 810 shows pores on top surface.

Further description includes the development of chemical composition and deposition process to construct mesoporous membranes on ceramic substrates. Mesoporous zirconia, titania and silica membranes were layered onto large-pore ceramic substrates by using sol-gel processes. Efforts in support of this task included variations in chemical compositions of precursor sol-gel solutions, deposition and post-processing techniques to produce membranes with low tortuocity and high-speed fluid flow at low pressure.

Template-mediated approaches to bulk microporous materials have been employed since 1948 to form molecular sieves, but have only recently been adapted to form mesoporous materials. Researchers at Mobil, e.g. C. T. Kresge at al., "Ordered Mesoporous Molecular Sieves Synthesized by a Liquid Crystal Template Mechanism," *Nature,* 359, p. 710 (1992), and J. S. Beck et al., "A New Family of Mesoporous Molecular Sieves Prepared with Liquid Crystal Templates," *J. Am. Chem. Soc.,* 114, pp. 10834-10843 (1992), as well as elsewhere, e.g., Q. Huo et al., "Generalized Synthesis of Periodic Surfactant/Inorganic Composite Materials," *Nature,* 368, pp. 317-321 (1994), have shown that the use of surfactant molecules and assemblies as templates in the presence of inorganic oxide precursors (sols or alkoxides) leads to the formation of porous materials that possess narrow pore size distribution and tailorable pore sizes (1.5 nm to 4.5 nm).

When mixed with the microemulsion disclosed above, PAB provides an oxidizer suitable for use in neutralizing CAs and BAs. The oxidizer is not so powerful as to excessively oxidize the chemical agents VX and HD as discussed above, but is powerful enough to neutralize chemical agents and to serve to at least neutralize biological agents. Indeed, tests of the microemulsion decontaminant solution as set forth herein shows that the solution can perform as a biological sterilant, that is, it eliminates microbial life in the inanimate environment, including all forms of vegetative bacteria, bacterial spores, fungi, fungal spores, and viruses. This unforeseen efficiency of the solution provides advantages in a decontaminant not hitherto achieved. In accordance with various exemplary embodiments. FIG. 1 shows structures for micelle formulation; and FIG. 2 shows an isometric microscopic view of the lipophilic and hydrophilic components mixed within the emulsion.

Cationic surfactants, such as CTAB, have served as the removable templates and dictate the pore size. The films were produced by dip coating using an environmental chamber. The synthesis of mesoporous ceramic materials is reviewed by X. S. Zhao et al., "Advances in Mesoporous Molecular Sieve MCM-41", *Ind. Eng. Chem. Res.,* 35, pp. 2075-2090 (1996), and N. K. Raman et al., "Template-based Approaches to the Preparation of Amorphous, Nanoporous Silicas," *Chemistry of Materials,* 8, pp. 1682-1701 (1996), among others.

Researchers at Sandia National Laboratories have investigated the fabrication of periodic mesoporous ceramic films by two methods. The first method termed "Gas-Catalyzed Thin Film Synthesis" (GCTFS) involves diffusing ammonia into a homogeneous micellar coating solution on a substrate. In the second approach, the "preferential evaporation" (PE) method, the synthesis is started using a homogeneous surfactant-silica solution.

Both methods produced ceramic thin films with regular pores, narrow pore size distribution and high surface area: Two references are cited: H. P. Groger et al., "Template-mediated Synthesis of Periodic Membranes for Improved Liquid-phase Separations," Phase I Final Report, Department of Energy, Contract DE-FG02-96ER82119, 37 pp (1997); and R. Ganguli et al., "Rapid, Continuous Formation of Supported Mesoporous Films From Homogeneous Sols by a Surfactant-Templated Mechanism" (1997), submitted to *Nature*. Both Groger and Ganguli have described the evolution of structure in the mesoporous membrane accompanying dip coating and provided optical interference images of mesoporous films prepared with an initial surfactant concentration of 0.06M during dip coating at 7.6 cm/min. Films having a thickness in the 0.1 μm to 0.5 μm range were produced in seconds in a continuous coating process.

These authors described the development of structure in the drying film with distance above the free surfactant reservoir, and showed that the increasing concentration of surfactant lead to a phase transformation from free surfactant to micelles to a liquid crystalline phase acting as a template for the silica. The proposed formation mechanism involves cooperative assembly of silica- surfactant micellar species with supramolecular surfactant templates, either cylindrical micelles or hemi-micelles that self-assemble at the substrate-liquid and liquid-air interfaces at an early stage in the deposition process. The interior region exhibited a disordered micellar structure.

Efforts in support of the disclosure involved modification of template- mediated synthesis to develop superior ultrafiltration ceramic membrane filters. Using several removable organic molecule templates, membranes were synthesized to produce tailorable pore sizes, extremely narrow pore size distributions, ultrasharp particle size/molecular weight cutoffs, i.e., excellent selectivity, and increased permeance. This produced nanocomposite membranes with pores aligned in the direction perpendicular to the support. These pores are interconnected in the form of channels with gradually and step-like increase in pore diameter.

Defect-free thin layers of mesoporous zirconia, titania and silica were deposited onto large-pore ceramic substrates, including alumina disks, 47 mm in diameter, and ceramic tubes. The fabrication process included development of the chemical compositions for precursor sol-gel solutions and selection of fabrication parameters including withdrawal speed, atmosphere and reaction time. Parameters of the furnace regimes to remove template molecules and compose porous graded layered structure were also evaluated.

Figure 9:
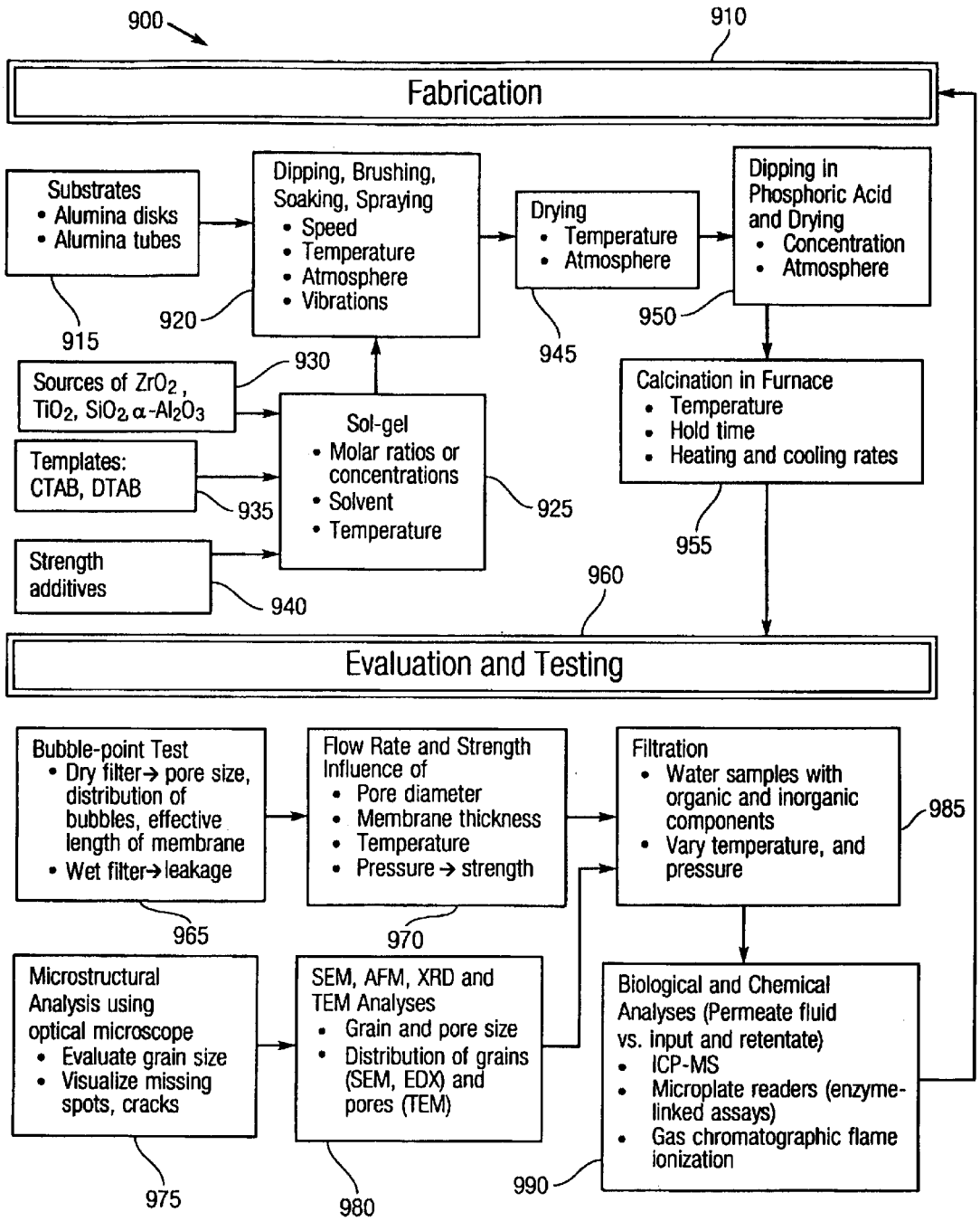
FIG. 9 is a flowchart diagram of fabrication and testing processes.

FIG. 9 represents a flow diagram 900 that describes the fabrications and testing processes used in this effort. For fabrication 910, substrates 915 are deposited 920 at controlled conditions. Sol-gel application 925 deposits on the substrate the filtration medium, which includes oxide sources 930, templates 935 and additives 940. After deposition, the medium is dried 945, dipped in acid 950 and calcinated in a furnace 955 for evaluation and testing. The test phase 960 includes a bubble-point test 965 with a flow-rate test 970, separately a microstructure analysis 975 and microscopy techniques 980 to produce a filtration evaluation 985 and finally analysis against adverse agents 990.

After manufacture, the filter medium is evaluated and tested. Mesoporous silica films were formed using cetyltrimethylammonium bromide (CTAB or $C_{16}H_{33})N(CH_3)_3Br$) or cetyltrimethylammonium hydrogen sulfate (CTAHS or $C_{19}H_{42}N{\cdot}HSO_4$) surfactant. Tetraethoxysilane (TEOS), or tetramethoxysilane (TMOS or $Si(OCH_3)_4$) have been used as the source of silica. Films having a thickness in the 0.1 μm to 0.5 μm range were produced in seconds in a continuous coating process.

Polymeric silica sols were prepared in a two-step process. In the first step, TEOS, ethanol ($C_2H_5OH$), water and hydrochloric add (HCl) were refluxed at 60° C. In the second step, water was added and the hydrochloric acid concentration was increased to 0.01M. The solution was stirred for 15 minutes at 25° C. Then the sols were aged at 50° C. for up to 8 hours and diluted with ethanol. CTAB was added to the solution in quantities corresponding to a solution concentration ranging from 0.03M to 0.11M.

Several films were deposited on the substrate material by dip coating at rates ranging from 7.6 cm/min to 50.9 cm/min using an environmentally controlled dip-coating apparatus. Special attention was devoted to damping of vibrations during the dipping process. Solvent evaporation increases the surfactant concentration above the critical micelle concentration (cmc) during the sol-gel dip coating process. This process presents a critical advance for thin film deposition, because none of the previously published methods provided a homogeneous mixture of reactants.

Experiments employing sources of zirconia and titania resulted in high-flux mesoporous membranes capable of withstanding high thermomechanical loads and are stable in the pH range from 0-to-14. Work was also performed to fabricate zirconia membranes using an acid-catalyzed zirconium (IV) propoxide solution. The zirconium (IV) propoxide ($Zr(OCH_2CH_2CH_3)_4$) sol was not aged. Solutions were dip-coated in a nitrogen-filled glove box with a withdrawal rate of approximately 500 mm/min (20 inches per minute). The coatings were stabilized in 1N phosphoric acid ($H_3PO_4$) and calcined at 400° C. in oxygen for one hour. Upon calcination, the hexagonal (alpha) and cubic (gamma) phases should undergo partial consolidation while the lamellar phase collapses.

Thermally induced stresses and thermal cracks represent an important factor that influences membrane structure after calcination in the furnace. To minimize risk of thermal cracking during the shrinkage in cooling phase, the coefficients of thermal expansion of the materials of substrate and membrane should preferably be closely matched. The low-temperature methods as well as multi- layer membrane structures "smoothing" thermal stress gradients were used in this effort. Amorphous membranes were deposited, converted to a periodic nanocomposite membranes and the template removed with retention of thermo- mechanical stability.

Microstructural evaluation of the membranes was performed by using X-ray diffraction, transmission electron microscopy, and scanning electron microscopy. These types of analyses provided data on the pore size and alignment, periodicity of pore arrays and membrane thickness. Optical microscope was used for evaluation of membrane homogeneity and possible defects including thermally induced cracks.

Atomic force microscopy (AFM) was performed on zirconia films deposited on alumina and glass substrates at different withdrawal speeds, ranging from 3 in/min to 25 in/min, using sol-gels with different amounts of CTAB, from 2% to 10%. The AFM was performed using tapping mode of silicon cantilever (resonant frequency from 280 kHz to 500 kHz) with conical tip attached to the end of the cantilever.

Presumably, the bluntness of the conical tip with diameter about 20Å places a limit on the minimal pore diameter to be detected using the AFM method. The AFM image 400 in FIG. 4 shows alumina disk surface with pore near 200Å in diameter. Zirconia membrane (with 2% of CTAB) was deposited on the alumina disk at withdrawal speed of 3 in/min.

The 3-D and phase images revealed patterns of densely packed grain with minimal grain sizeD≈380Å. Additional AFM phase images of zirconia membrane, prepared with 4% of CTAB and deposited on alumina disk (nominal d≈200Å) at withdrawal speed of 20 in/min, suggest that membrane formed a more uniform than that in image 400, fine-grain structure with pore size near 26Å.

FIG. 10 shows a scanning electron microscope photograph 1000 with a top surface of zirconia layer deposited on glass substrate. This type of web structure was used as a high flow-rate sub-layer for ceramic membranes with smaller pore size.

The next aspect for description is acquisition of test data to characterize membrane performance. Tubular and disc-shaped membrane filters were tested under various operating conditions for thermo-mechanical strength and chemical stability. Evaluation parameters included flow rates, sharpness of the separation factor/molecular weight cutoff and the tendency toward fouling. Influence of the nanostructural changes involving variation in the thickness of layers and pore orientation on the flow stability was investigated.

FIG. 11 shows a tabular list 1100 of tubular filters as Table I, describing the first group that comprise twelve filters by chemical composition (including number six mentioned earlier). Data from thermo-mechanical testing included furnace temperature and cooling rates, as well as transmembrane pressure used to evaluate thermo-mechanical strength. Testing of chemical (pH-range) stability was also performed on the filters for potential cleaning (also via burning of organic contaminants in a furnace) followed by re-use.

Figure 12:
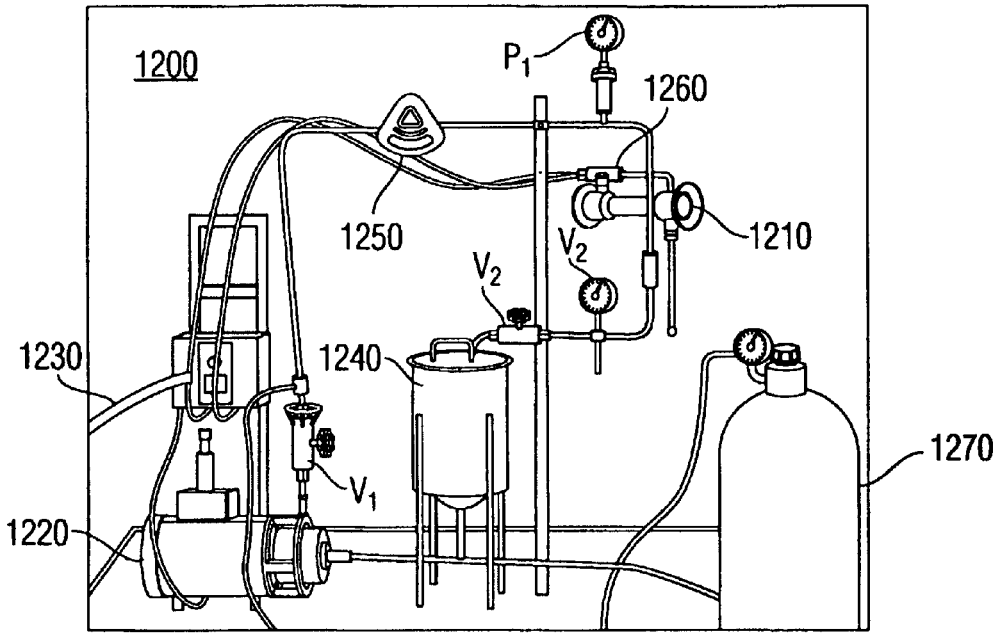
FIG. 12 is a photographic view of a test setup.

FIG. 12 shows a photograph 1200 of the bench-top membrane test unit. A modified ASTM F-316 test was performed on dry and half-wet filters to visualize patterns of permeate gas nitrogen streams and to measure the bubble- point pressure as an equivalent to the effective pore size of the membranes. The test setup includes a filter-holder 1210, pump 1220, a cooling pipe 1230, a storage tank 1240, a flowmeter 1250, a back-flush unit 1260 and a nitrogen tank for back-flush pressurization.

Figure 13:
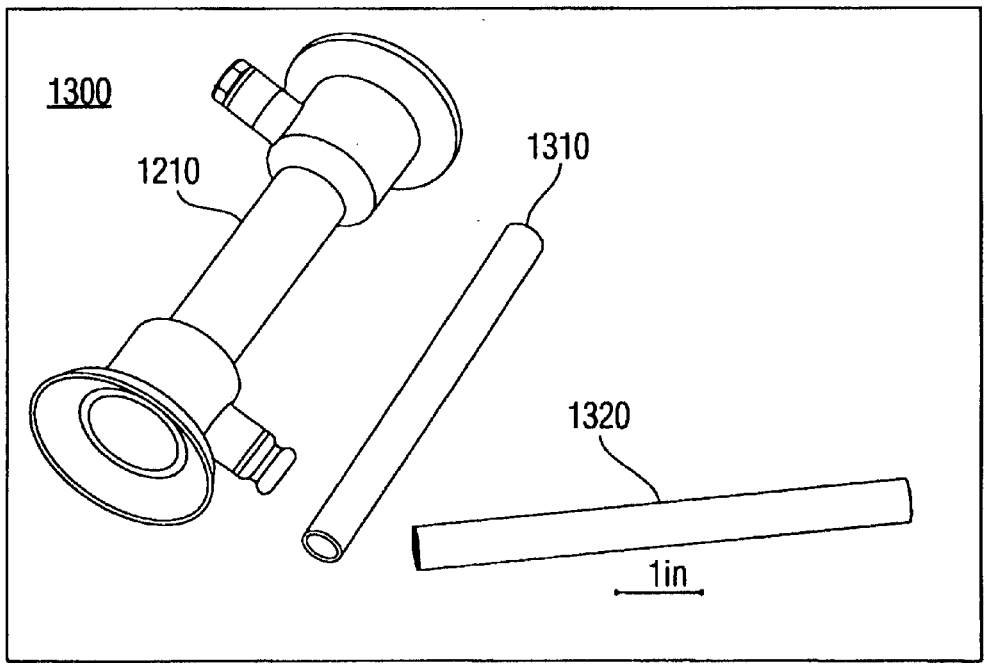
FIG. 13 is a photographic view of test equipment components.

The storage tank 1240 provides a measure of volume $V_2$, and dial gauges $P_1$ and $P_2$ provide respective pressure measurements upstream and downstream of the filter-holder 1210. FIG. 13 shows test equipment components 1300, including the filter-holder 1210 with tubular filters 1310, 1320 at five inches in length and with epoxy coated ends.

Figure 14:
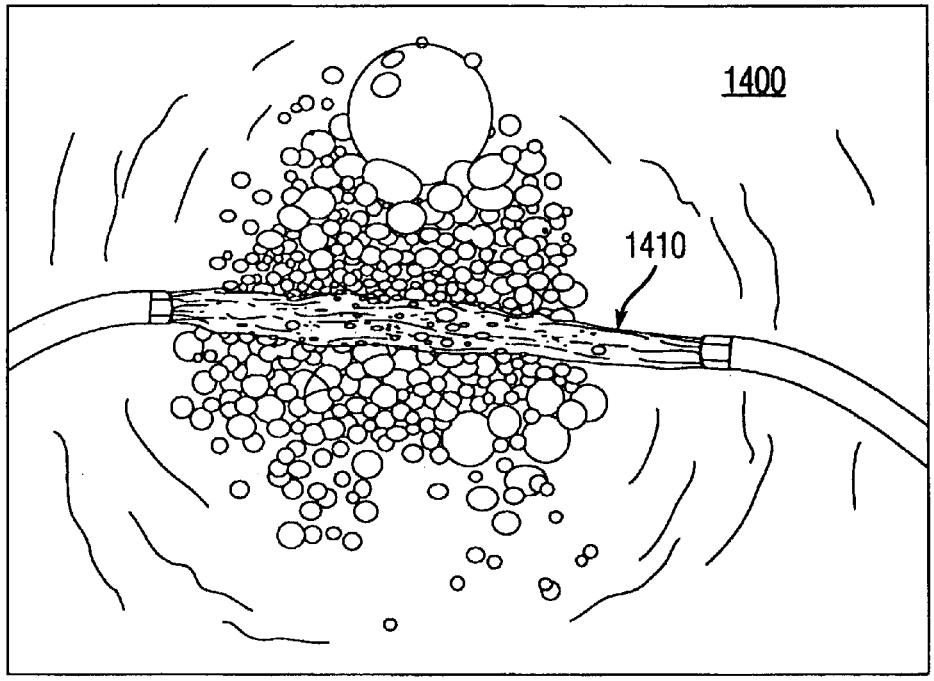
FIG. 14 is a photographic view of a bubble test.
Figure 15:
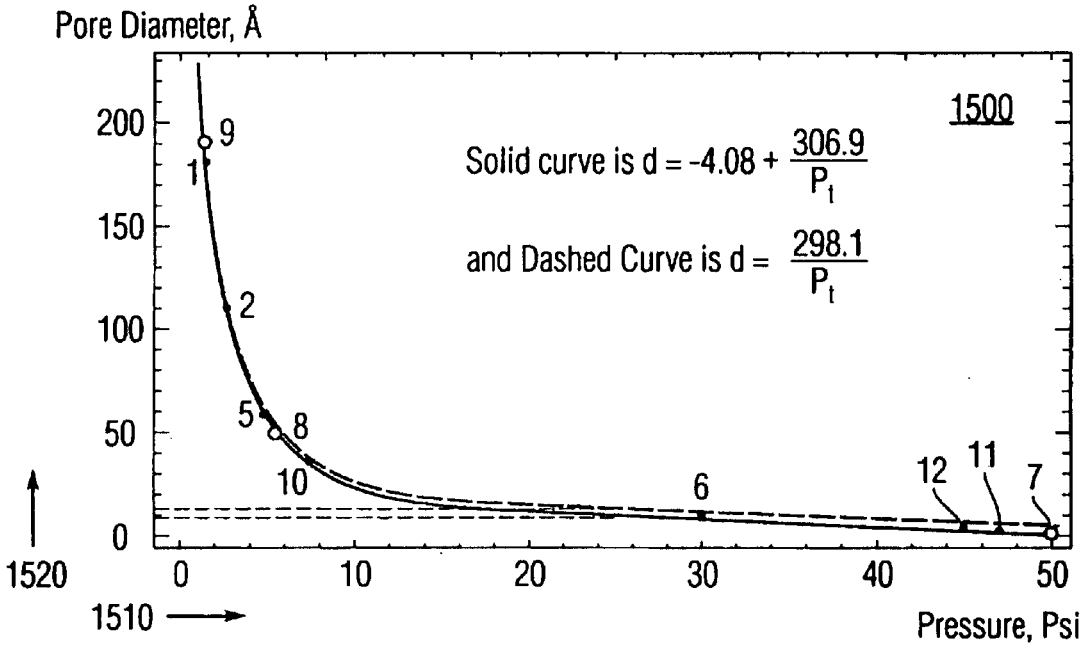
FIG. 15 is a curve-fit plot graph of bubble tests.

FIG. 14 illustrates a photographic image 1400 of the dry bubble-point test showing bubbles form around the filter 1410 at 10 psi. FIG. 15 shows a curve-fit test data plot graph 1500. Pressure represents the abscissa 1510 and pore diameter represents the ordinate 1520. A pair of filled curves, solid 1530 and dash 1540 are plotted together, showing inverse relationship to pressure. Number labels adjacent to the plotted points indicate the filter number corresponding to Table I.

The equivalent pore diameter in filters is defined from dry bubble-point pressure. In wet bubble-point test, filters were put under water for about 20 minutes, then connected to clear polymer pipes and loaded by nitrogen at room temperature, up to 48 psi. All submerged filters revealed no permeate bubbles. To perform dry bubble-point test, the filters have been dried by hot air, connected to clear polymer pipes and loaded by nitrogen at room temperature, up to 48 psi. Then the filters were rapidly submerged under water, and within one minute, nitrogen pressure was monotomically reduced to the bubble point level when weak but continuous gas bubble streams were observed in more than ten points of outer surface of the filters. This test also helped to detect defect cracks, poorly sealed ends, and uneven thickness of membrane.

FIGS. 16 and 17 respectively show summarized tabular lists for dry bubble- point pressure 1600 and permeate water flowrate 1700. These are respectively labeled Tables II and III test results for corresponding pore size. The numbered filters are identified by coating and substrate in 1600, with deionized water flow by pressure in 1700. Typically, bubble-point pressure varies inversely with pore size.

Figure 18:
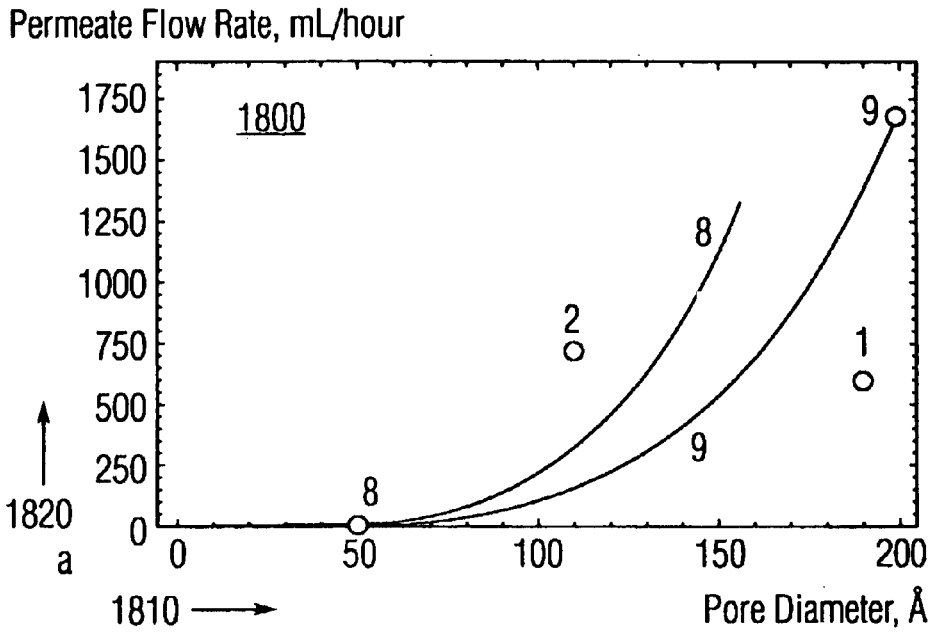
FIG. 18 is a data plot graph of permeate flow.
Figure 19:
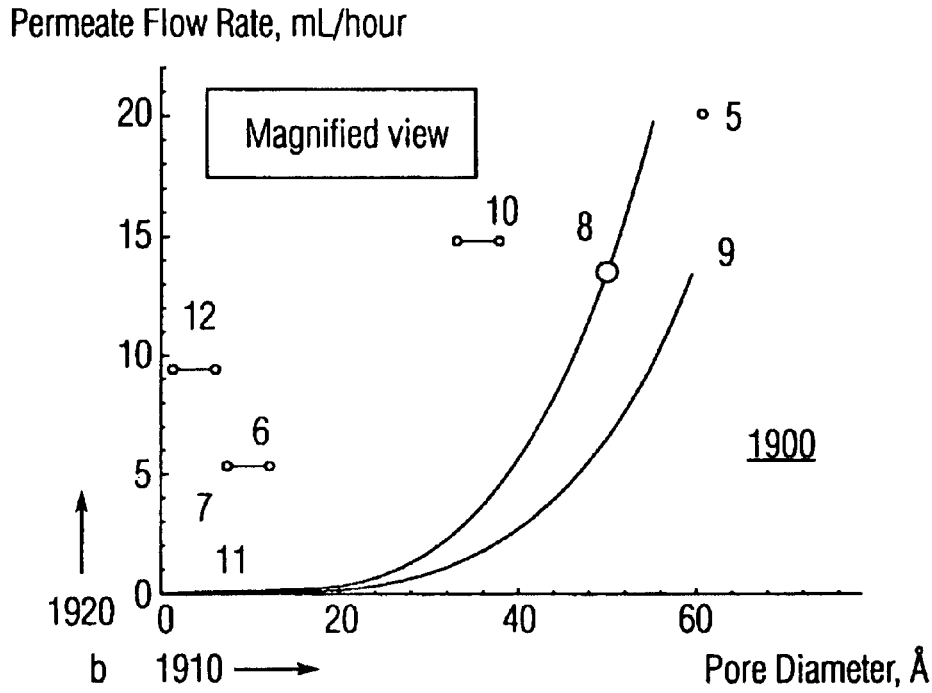
FIG. 19 is a magnification plot graph ot the permeate flow.

FIGS. 18 and 19 show test plots for permeate flow rate of deionized water measured in the first twelve tested filters. The first flow plot 1800 includes pore diameter (in angstroms) as abscissa 1810 and permeate flow rate (in milliliter-per-hour) as ordinate 1820. The second detail plot 1900 includes pore diameter as abscissa 1910 and permeate flow rate as ordinate 1920. Select filter numbers are plotted as points in both plots. Based on the results of the evaluation of pore diameters, filters #8 (50Å), #6 (7Å-12Å) and #12 (1Å-6Å), presenting three ranges of pore size, were selected for comparative characterization of filtration efficiency. Filtration efficiency was evaluated by using water-based solutions of two metal-complexing absorbing dyes, sulfonazo III sodium salt ($C_{10}H_6Na_2O_7S_2$), 8- hydroxyquinoline-5-sulfonic acid hydrate ($C_9H_9NO_5S$), as well as cesium nitrate ($CsNO_3$).

Both input and permeate solutions were analyzed by using Inductively Coupled Plasma/Mass Spectrometer, microplate readers (enzyme-linked assays) and Gas Chromatographic Flame Ionization Detection instruments. Analyses of water samples were performed at Chemical Solutions, Ltd., Mechanicsburg, Pa. Three replicate samples per unknown were analyzed using the gas chromatographic flame ionization detection test procedure. All tests involving chemical and biological agents were performed by using replicates and known additions as a control (or blank). The III sodium salt has molecular weight at approximately 724.67MW and absorption peak at 570 nm.

Figure 20:
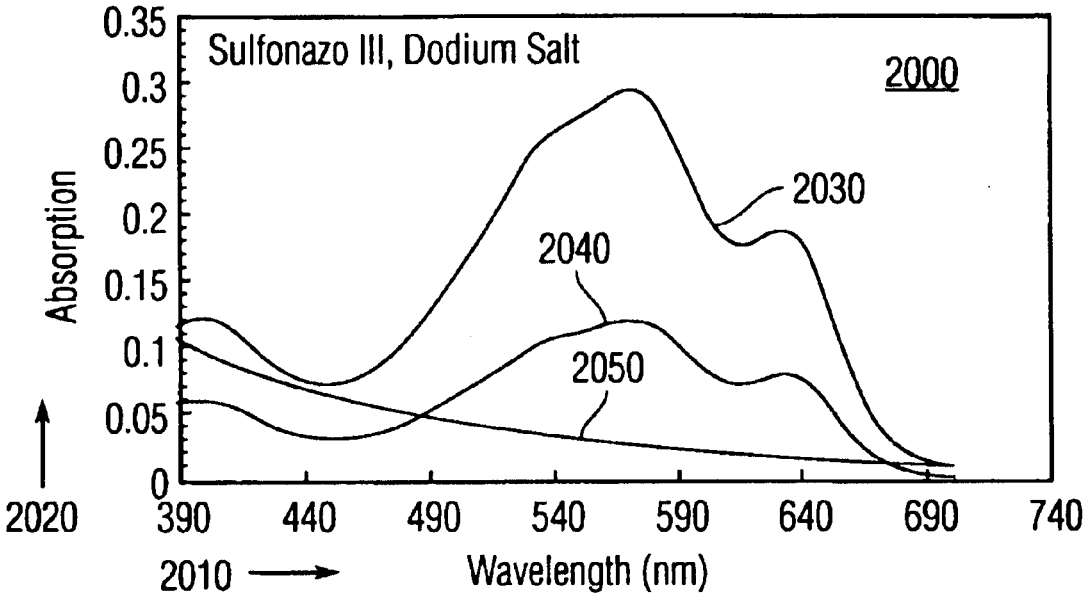
FIG. 20 is a line plot graph of sodium salt absorption.
Figure 21:
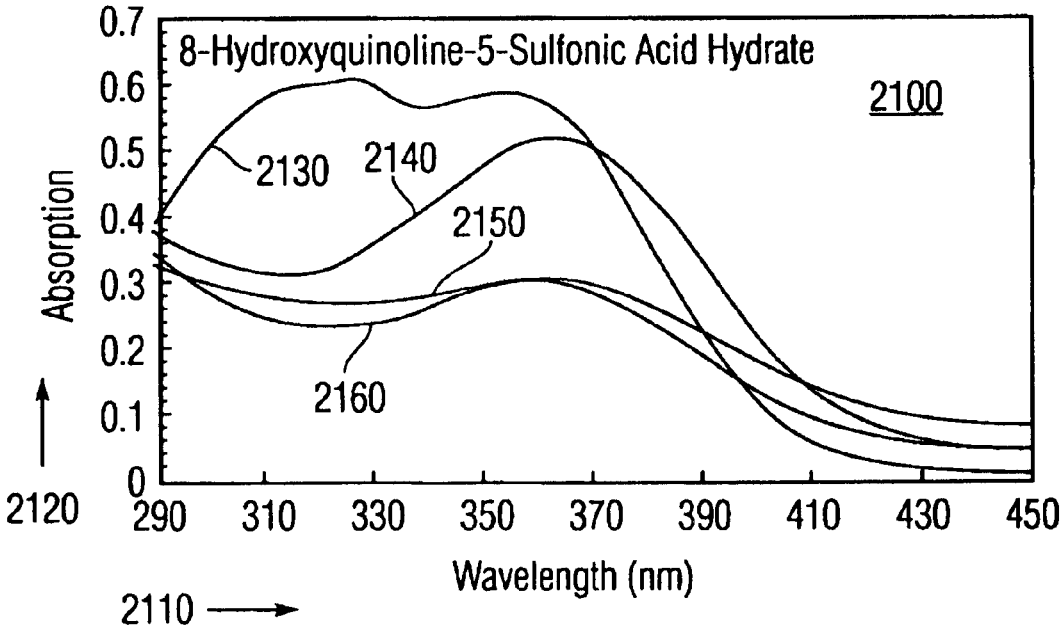
FIG. 21 is a line plot graph of acid hydrate absorption.

FIGS. 20 and 21 show absorption spectra of permeate fluids. For FIG. 20, the sodium salt spectra plot 2000 includes wavelength (in nanometers) as abscissa 2010 and absorption as ordinate 2020. Plotted curves include input solution as 2030, post-filter #8 as 2040 and post-filter #9 as 2050. Amplitudes for the #8 curve 2040 follow attenuated the input curve 2030, whereas amplitudes for the #9 curve 2050 gradually diminish as wavelength increases.

For FIG. 21, the hydrate plot 2100 includes wavelength as abscissa 2110 and absorption as ordinate 2120. Plotted curves include retentate as 2130, post- filter #8 as 2140, post-filter #6 as 2140 and post-filter #12 as 2160. All these curves appear to have a local maximum at about 370 nm, albeit at differing amplitudes.

According to the absorption spectrum of permeate fluids in plot 2000, filter #8 provided 60% and filter #6 provided 92% reduction of sulfonazo III sodium salt, as compared to initial peak at 570 nm. Molecular weight of 8-hydroxyquinoline-5-sulfonic acid hydrate is 225.23 MW. The absorption spectra of 8-hydroxyquinoline-5-sulfonic acid hydrate is shown in plot 2100. Absorption peak at 368 nm reduced 14% after passage through filter #8, and 51% after passage through filters #6 and #12.

The filtration efficiency has been also evaluated by using a solution containing $2\times10^{-4}$M, i.e., approximately 30,000 ppb, of cesium nitrate. The samples of permeate and retentate of filter #6 were analyzed using inductively coupled plasma/mass spectrometry. The concentrations of cesium in retentate and permeate appeared to be correspondingly 25,600 ppb and 400 ppb. This represents 98.4% reduction of cesium in permeate.

Figure 22:
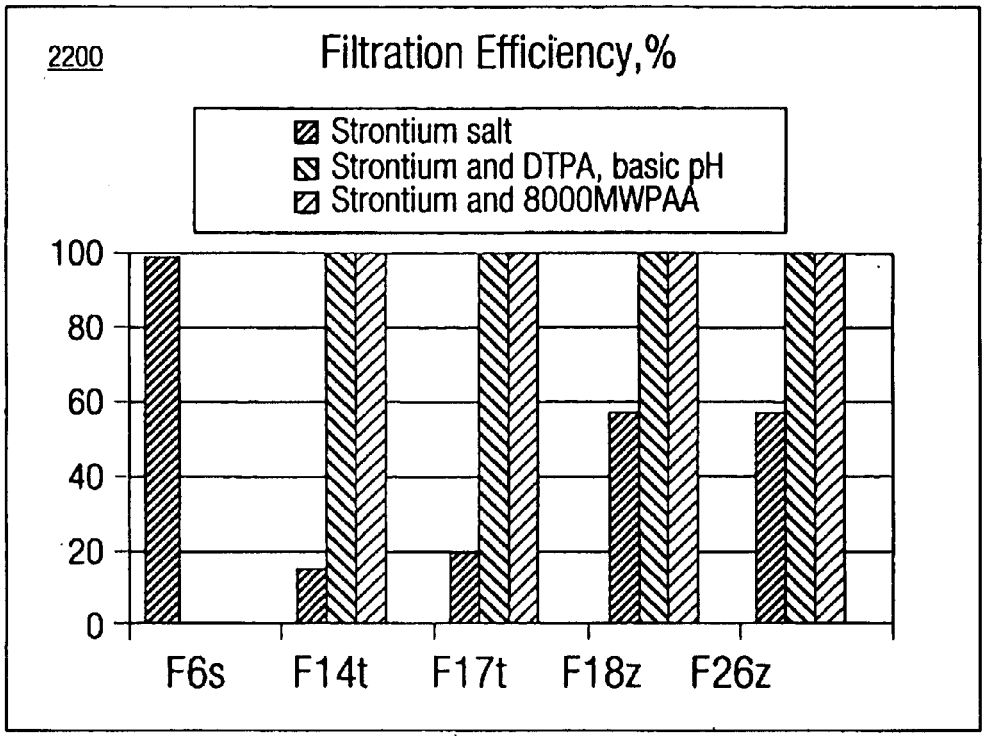
FIG. 22 is a column plot graph of filtration efficiency.
Figure 23:
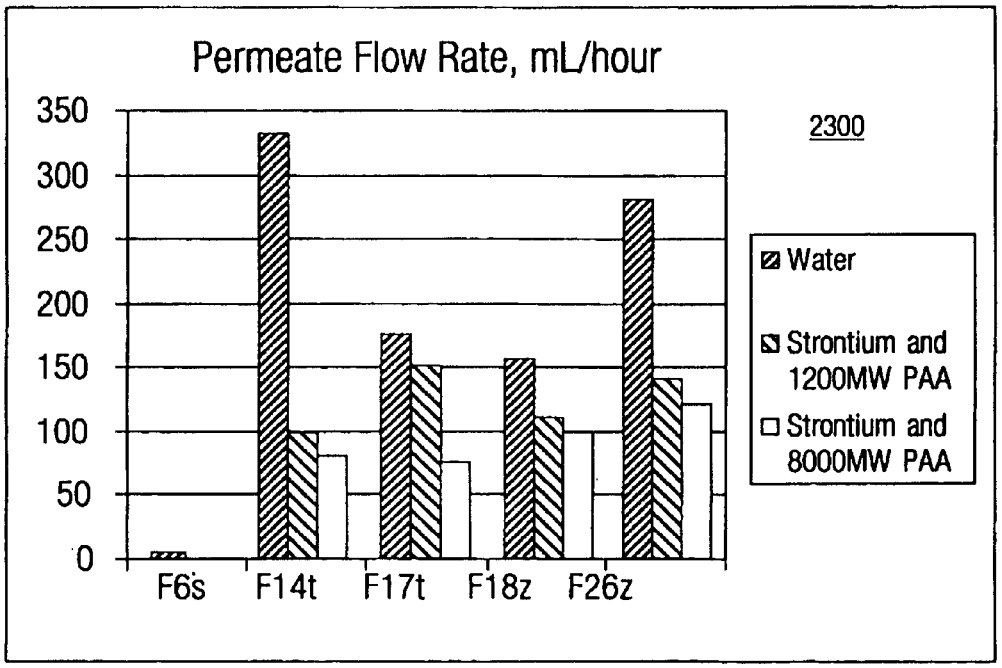
FIG. 23 is a column plot graph of permeate flow rate.

Filters marked as series BD exhibited flow rates 30 to 50 times higher than those in the commercially available filters. Also, filters BD-12 and BD-13 exhibited flow rates about 10% higher than those in uncoated alumina substrates. FIGS. 22 and 23 show column bar charts 2200 and 2300 with strontium salt respectively for filtration efficiency and permeate flow rate for selected membrane filters. FIG. 24 tabulates these data for filtration efficiency as 2400 in Table IV for Filtration Efficiency of selected membrane filters. FIG. 25 tabulates data for strontium filtration with zirconia membrane filters as 2500 in Table V Filtration of Strontium Performance.

Figure 26:
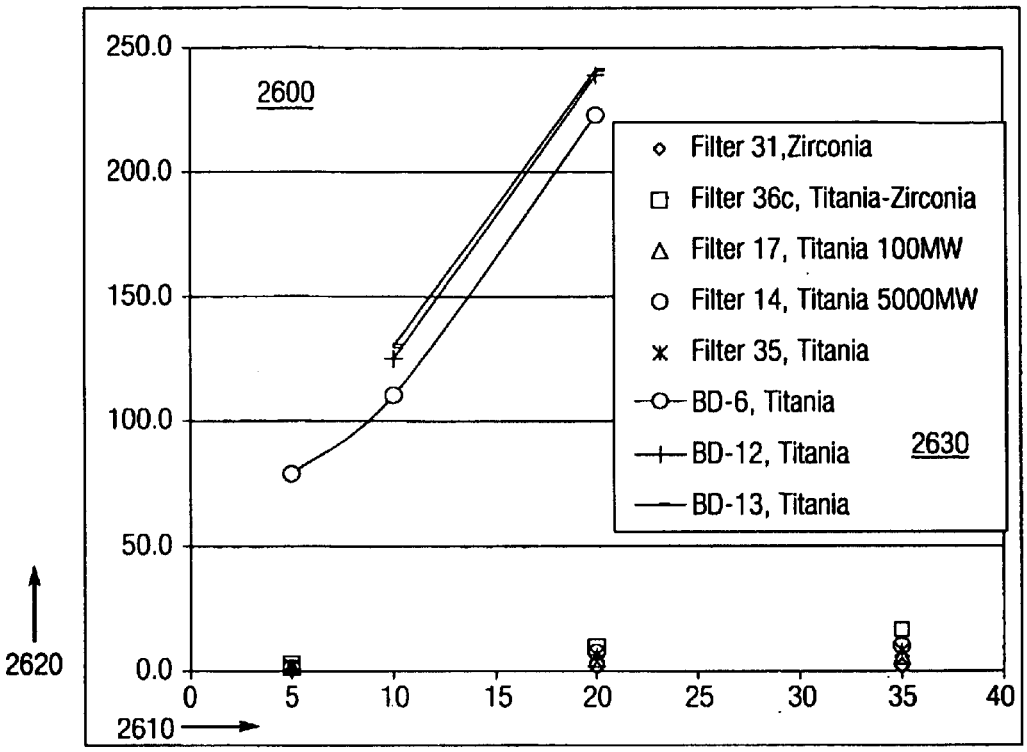
FIG. 26 is a data plot graph of permeate flow rate.

FIG. 26 shows a plot 2600 for improvement in BD-series of new filters showing high permeate flux as a function of applied pressure. The plot 2600 includes pressure (in psi) as abscissa 2610 and permeate flux as ordinate 2620. A legend 2630 identifies particular tested filters by plot symbols. The BD-series exhibited higher flux increase with corresponding rise in pressure, whereas the titania and zirconia filters demonstrate comparative pressure insensitivity.

In these tests, several multilayered ceramic membrane filters exhibited rates close to or above those of uncoated large-pores substrates. These filters provided up to 99.96% reduction of cesium (195 MW) and strontium (212 MW) ions from water: Also, as compared to commercially available titania membrane filters (1000 MW and 5000 MW cut-off), these filters provided much higher flow rates. Additionally, zirconia membrane on alumina substrate filters have been used in tests involving pump oil and contaminated motor oil.

Optimization of the funnel-type structure by varying membrane materials; layer thickness, and sequence resulted in very high flow rates and excellent separation of particles was also performed. In several experiments, funnel- shaped membrane filters introduced flow rates somewhat above those of substrates; this phenomenon of accelerated flow was explained by the capability of membranes to reduce flow turbulence.

During calcination, titania, zirconia and silica layers produce two types of micro-structure: (1) densely packed grains with gaps between the grains and (2) loosely packed grains forming web structures. In the densely packed structures, the gaps are 10 to 100 times smaller than grain diameter. Experiments showed that grains have narrow distribution in size, which is a highly desirable result. Web structures produce flow rates much higher than that through granular structures. Web structure, developed mainly in zirconia membranes was used as a high-flow-rate sublayer for fine-grain titania membranes.

Novel fabrication process involved new chemical compositions and optimized processing regimes. These regimes accounted for the coefficients of thermal expansion in ceramic layers and substrate, as a new tool to tailor pore size in mesoporous membranes. Filters exhibiting excellent flow rate and superior separation efficiency were fabricated with and without surfactants.

Carbon, sulfur and other "burnable" chemical elements uniformly distributed in sol-gel and subsequently in wet membrane material can be burned during calcination in furnace. At about 400° C. these elements were burned and subsequently washed out of the membrane material by deionized water by using transmembrane pressure. This finding, role of "burnable" elements as element forming free surfaces between ceramic grains, constitutes another novel feature.

At least one innovative feature relates to modification of both web and large-grain structures. The process involves attaching elongated "whisker- type" elements to the web or larger pores to form a three-dimensional (3-D) mesh or web composed of burnable whiskers. This mesh can be used to trap and accumulate solid particles in a fairly broad size range. Subsequently, trapped particles and the web can be removed from the filter surface, for example by burning "web" at high temperatures and subsequently by washing off by using water or solvents. This approach is beneficial and low-cost allowing for easy redeposition of new web and re-use of the filters.

Modified ceramic sol-gels were synthesized and utilized in the fabrication of mesoporous films containing various functionalities and dyes. The functionalities produced mesoporous ceramic films that are selective toward specific analyses. A template-mediated approach was utilized to encapsulate dye molecules into the sol-gel matrix. Sol-gels were produced using alkoxide compounds such as, tetraethoxysilane (TEOS or $Si(OC_2H_5)_4$), titanium (IV) isopropoxide and zirconium (IV) n-propoxide, as reported in Groger.

Figure 27:
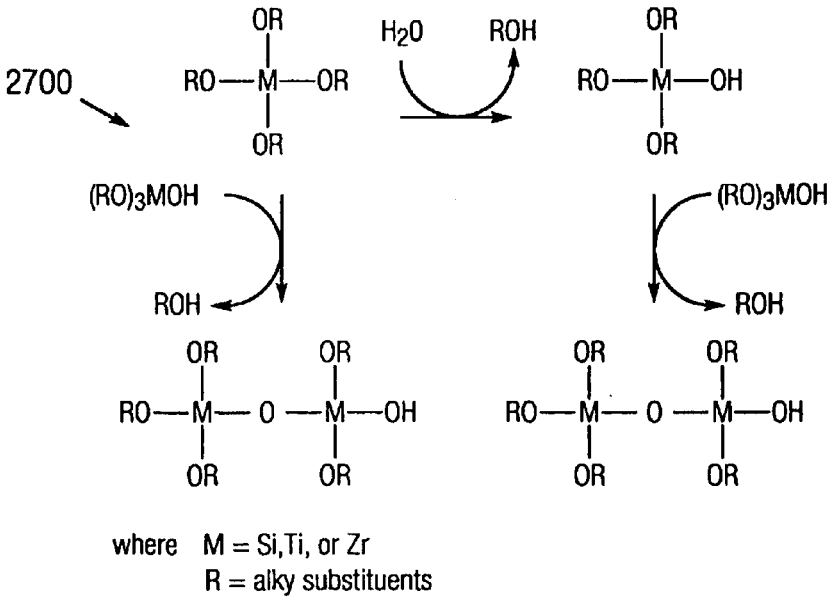
FIG. 27 is a molecular diagram of orientations in production.

FIG. 27 shows a general reaction scheme for the polycondensation of metal alkoxide compounds. In these chemical structures, M is a metal, e.g., silicon, titanium or zirconium, R is an alkyl substituent, e.g., hydrogen, and O is oxygen. Silica sol-gel solutions were produced utilizing a two-step procedure. TEOS, ethanol, water and hydrochoric acid were refluxed at 60° C. in a molar ratio of 1-to-3-to-8-to-$5\times10^{-5}$.

The second step involved increasing the hydrochloric acid concentration to 0.01M. The solution was stirred for 15 minutes at 25° C. The silica sols were aged at 50° C. for up to 8 hours and diluted with ethanol. Titania solgels were synthesized using the titanium (IV) isopropoxide, tert-amyl alcohol, water and nitric acid. The water was added in a tert-amyl alcohol solution using a syringe at a rate of 6 mL/hr. The reaction mixture was refluxed at 60° C. for 30 minutes. The reaction molar ratio of alkoxide, solvent, water and acid was from 1-to-7-to-3-to-$5\times10^{-5}$. The sols were diluted using tert-amyl alcohol. A surfactant compound, such as CTAB. was added to the diluted sol-gel solutions in quantities corresponding to a concentration ranging from 0.03M to 0.11M.

The literature provides reviews for the incorporation of organic, inorganic and biorganic molecules into mesoporous materials. See K. Moller, and T. Bein, "Inclusion Chemistry in Periodic Mesoporous Hosts", *Chemistry of Materials,* 10, pp. 2950-2963 (1998), and D. Avnir, "Organic Chemistry within Ceramic Matrices: Doped Sol-gel Materials", *Accounts of Chemical Research,* 28, pp. 328-334 (1995). A majority of the work has utilized silica, $SiC_2$, as the sol-gel material. The entrapped dopant molecule is added during the polycondensation reaction.

As the reaction proceeds the dopant molecule is enclosed by the ceramic sol- gel matrix, as shown in FIG. 28. Incorporation into a sol-gel matrix offers many advantages, as described by D. Avnir et at, "Enzymes and Other Proteins Entrapped in Sol-gel Materials," *Chemistry of Materials,* 6, pp. 1605-1614 (1994), such as:

(a) stability of encapsulated molecules, by virtue of rigidity of the cage, (b) prevents leaching of encapsulated molecule, (c) obtained in various forms, such as powders, fibers or films, and (d) offer high sensitivities of interaction.

FIG. 29 provides a list of compounds 2900 through which sol-gels were modified, as shown in Table VI. Deep-red and near-infrared dye molecules were encapsulated into the ceramic sol-gel matrix. Polymers, such as Nafion®, and large organic molecules were also incorporated by encapsulation. The functionality of sol-gels was modified using various silane compounds. The silane modifiers were added to the sol-gel reaction mixture after the addition of the water solution. Other modifiers included metal nitrate salts, such as iron (III) nitrate, and polyoxometallates.

The mesoporous ceramic sol-gel films were deposited on glass substrates using a dip-coating apparatus at withdrawal rates ranging from 7.6 cm/min to 50.9 cm/min. Mesoporous ceramic films were produced with a thickness in the 0.1 μm to 0.5 μm range. The air-dried membranes were calcinized in a furnace at 300° C. for 2 hours.

Procedure for sol-gel Synthesis can be described by the following procedural steps:

(1) glassware was cleaned with soap and water, rinsed with acetone and dried in the drying oven at 110° C.

(2) hot glassware was assembled under nitrogen and allowed to cool to room temperature.

(3) zirconium (IV) propoxide (or Titanium (IV) isopropoxide) and nitric acid solution in solvent was charged to reaction flask. Any additives (such as dyes or sol-gel modifiers) were also added into the flask.

(4) the mixture was heated to 60° C. under nitrogen.

(5) water/solvent solution was then added in 50° μL aliquots. POM modifiers, if any, were dissolved in the water before mixing in the solvent.

(6) the mixture was allowed to reflux for 30 minutes at 60° C. under nitrogen.

(7) a surfactant and the reaction mixture were added to a volumetric flask and diluted with solvent.

(8) the sol-gel solution was placed in a plastic bottle and allowed to stir at room temperature for one hour.

(9) after stirring, the solution was then allowed to settle for one hour before using sol-gel.

Additional tests were performed on the DuoSeal pump oil and contaminated SAE 30 HD oil at elevated temperature and pressure. FIG. 30 shows a plot 3000 of permeate flow rate of pump oil as a function of temperature. The plot 3000 includes pressure (in psi) as abscissa 3010 and permeate flux as ordinate 3020, showing a curve-fit line 3030. FIG. 31 provides a tabular summary of tests with pump oil. FIG. 32 shows a plot 3200 of scaled permeate flow rate as a function of input pressure for filtering deionized water. The plot 3200 includes input pressure (in psi) as abscissa 3210 and scaled permeate flux as ordinate 3220, showing a curve-fit line 3230. FIG. 33 provides a tabular summary of tests with motor oil. In both plots 3000 and 3200, the permeate curve-fit lines 3030, 3230 linearly increase with rise in pressure.

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments.

What is claimed is:

1. A particulate filter for passing through select permeate particles in a fluid medium from inflow to outflow regions while restraining reticulate particles, said filter comprising:

a coarse-grain ceramic porous substrate that opens into the outflow region as an outflow cavity;

an intermediate-grain porous ceramic layer disposed on said substrate;

a fine-grain ceramic porous membrane of zirconium oxide disposed on said layer and that opens into the inflow region containing the medium as an inflow cavity, said membrane having pore diameters between 5Å and 50Å; and a channel that directionally expands and connects said inflow and outflow cavities together by a substantially funnel-shape passage, wherein said inflow cavity permits the permeate particles and the medium but obstructs the reticulate particles.

2. The filter according to claim 1, wherein said substrate is one of α- aluminum oxide, γ-aluminum oxide and zirconium oxide.

3. The filter according to claim 1, wherein said substrate is α-aluminum oxide, and said layer is γ-aluminum oxide.

4. The filter according to claim 1, wherein said substrate is γ-aluminum oxide having pore diameter of about 50Å.

5. The filter according to claim 1, wherein said substrate is zirconium oxide having pore diameter of about 200Å.

6. The filter according to claim 1, wherein said substrate is α-aluminum oxide and said layer is silicon oxide.

7. The filter according to claim 1, wherein filter is a cylindrical tube having an annular interior for said inflow region.

* * * * *